(12) United States Patent
     Kwon et al.

(10) Patent No.: US 12,652,199 B2
(45) Date of Patent: Jun. 9, 2026

(54) COMMUNICATION INTERFACE CIRCUIT SUPPORTING COMMUNICATION LINK CHANGE AND METHOD OF OPERATING SAME

(71) Applicant: Samsung Electronics Co., Ltd., Suwon-si (KR)

(72) Inventors: Daechul Kwon, Suwon-si (KR); Dongyoung Song, Suwon-si (KR); Hyojin Cho, Suwon-si (KR); Gyeonghan Cha, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 231 days.

(21) Appl. No.: 18/644,603

(22) Filed: Apr. 24, 2024

(65) Prior Publication Data

US 2025/0071002 A1     Feb. 27, 2025

(30) Foreign Application Priority Data

Aug. 24, 2023    (KR) ........................ 10-2023-0111144

(51) Int. Cl.
     *H04L 25/02*        (2006.01)
     *H04L 5/00*         (2006.01)
(52) U.S. Cl.
     CPC ........ *H04L 25/0272* (2013.01); *H04L 5/0048* (2013.01); *H04L 25/026* (2013.01)
(58) Field of Classification Search
     CPC ... H04L 1/0033; H04L 1/0036; H04L 5/0048; H04L 25/0272; H04L 25/026; H04L 25/085; H04L 25/4917; H04L 12/40136; G06F 5/065; G06F 13/4295
     See application file for complete search history.

(56)                References Cited

U.S. PATENT DOCUMENTS

|  |  |  |  |
|---|---|---|---|
| 8,996,740 B2 | 3/2015 | Wiley et al. | |
| 9,520,988 B1 | 12/2016 | Wiley et al. | |
| 9,621,333 B2 | 4/2017 | Wiley et al. | |
| 10,320,593 B2 | 6/2019 | Kim et al. | |
| 10,355,894 B2 | 7/2019 | Wiley | |
| 11,108,604 B2 | 8/2021 | Lee et al. | |
| 11,240,077 B2 | 2/2022 | Lee et al. | |
| 11,641,294 B2 | 5/2023 | Lee et al. | |

(Continued)

FOREIGN PATENT DOCUMENTS

| | | |
|---|---|---|
| CN | 114968868 A | 8/2022 |
| KR | 10-1959825 B1 | 3/2019 |

*Primary Examiner* — David B Lugo
(74) *Attorney, Agent, or Firm* — Harness, Dickey & Pierce, P.L.C.

(57)                ABSTRACT

A communication interface circuit includes a protocol layer circuit that generates packet data based on input data, and a physical layer circuit that encodes the packet data to output a transmission state, and drives a data lane including a plurality of three-phase wire links based on the transmission state, wherein the physical layer circuit may include an encoder that calculates the transmission state based on a preceding state output from the encoder in a previous unit interval, a symbol mapped to the packet data, and a control code, and wherein the control code instructs an encoding change based on a coupling relationship of the plurality of three-phase wire links. The communication interface circuit stably transmits data.

20 Claims, 17 Drawing Sheets

(56)        References Cited

U.S. PATENT DOCUMENTS

| | | |
|---|---|---|
| 2016/0179739 A1 | 6/2016 | Kil et al. |
| 2019/0266119 A1* | 8/2019 | Wiley ................. G06F 13/4068 |
| 2023/0087897 A1 | 3/2023 | Chou et al. |

* cited by examiner

COMMUNICATION INTERFACE CIRCUIT SUPPORTING COMMUNICATION LINK CHANGE AND METHOD OF OPERATING SAME

CROSS-REFERENCE TO RELATED APPLICATIONS

This application claims priority under 35 U.S.C. § 119 to Korean Patent Application No. 10-2023-0111144 filed on Aug. 24, 2023, in the Korean Intellectual Property Office, the disclosures of which are incorporated by reference herein in their entireties.

BACKGROUND

Example embodiments described herein relate to a communication interface circuit and a method of operating the same.

Components inside an electronic device exchange data with each other through communication links. Components connect to communication links through communication interface circuits. The transmission data is converted into a format suitable for transmission by a communication interface and transmitted through a communication link.

There is a standard for communication of data exchanged between components. For example, an image sensing device may exchange data with other components by using the camera serial interface (CSI) and C-PHY defined by the Mobile Industry Processor Interface (MIPI) alliance.

SUMMARY

Example embodiments provide a communication interface circuit that supports stable data transmission.

According to an example embodiment, a communication interface circuit includes a protocol layer circuit that generates packet data based on input data, and a physical layer circuit that encodes the packet data to output a transmission state, and drives a data lane including a plurality of three-phase wire links based on the transmission state, wherein the physical layer circuit includes an encoder that calculates the transmission state based on a preceding state output from the encoder in a previous unit interval, a symbol mapped to the packet data, and a control code, and wherein the control code instructs an encoding change based on a coupling relationship of the plurality of three-phase wire links.

According to an example embodiment, a communication interface circuit includes a physical layer circuit that generates a plurality of differential signals based on driving voltages of each of a plurality of three-phase wire links of a data lane and outputs a symbol based on the plurality of differential signals, and a protocol layer circuit that de-maps the symbol and outputs data, wherein the physical layer circuit includes a decoder that is configured to calculate the symbol based on a reception differential signal based on the plurality of differential signals, a preceding differential signal based on the plurality of differential signals in a previous unit interval, and a control code, and wherein the control code instructs a decoding change based on a coupling relationship of the plurality of three-phase wire links.

According to an example embodiment, a method of operating a communication interface circuit includes generating packet data based on input data, encoding the packet data to output a transmission state, and driving a data lane based on the transmission state, the data lane including a plurality of three-phase wire links, wherein the encoding of the packet data includes calculating the transmission state based on a preceding state output in a previous unit interval, a symbol mapped to the packet data, and a control code, and the control code instructs an encoding change based on a coupling relationship of the plurality of three-phase wire links.

The communication interface circuit according to the example embodiments of the present disclosure may stably transmit data.

BRIEF DESCRIPTION OF THE FIGURES

The above and other objects and features will become apparent by describing in detail example embodiments thereof with reference to the accompanying drawings.

FIG. 2 is a block diagram illustrating a transmission-side communication interface circuit according to an example embodiment;

Figure 11:
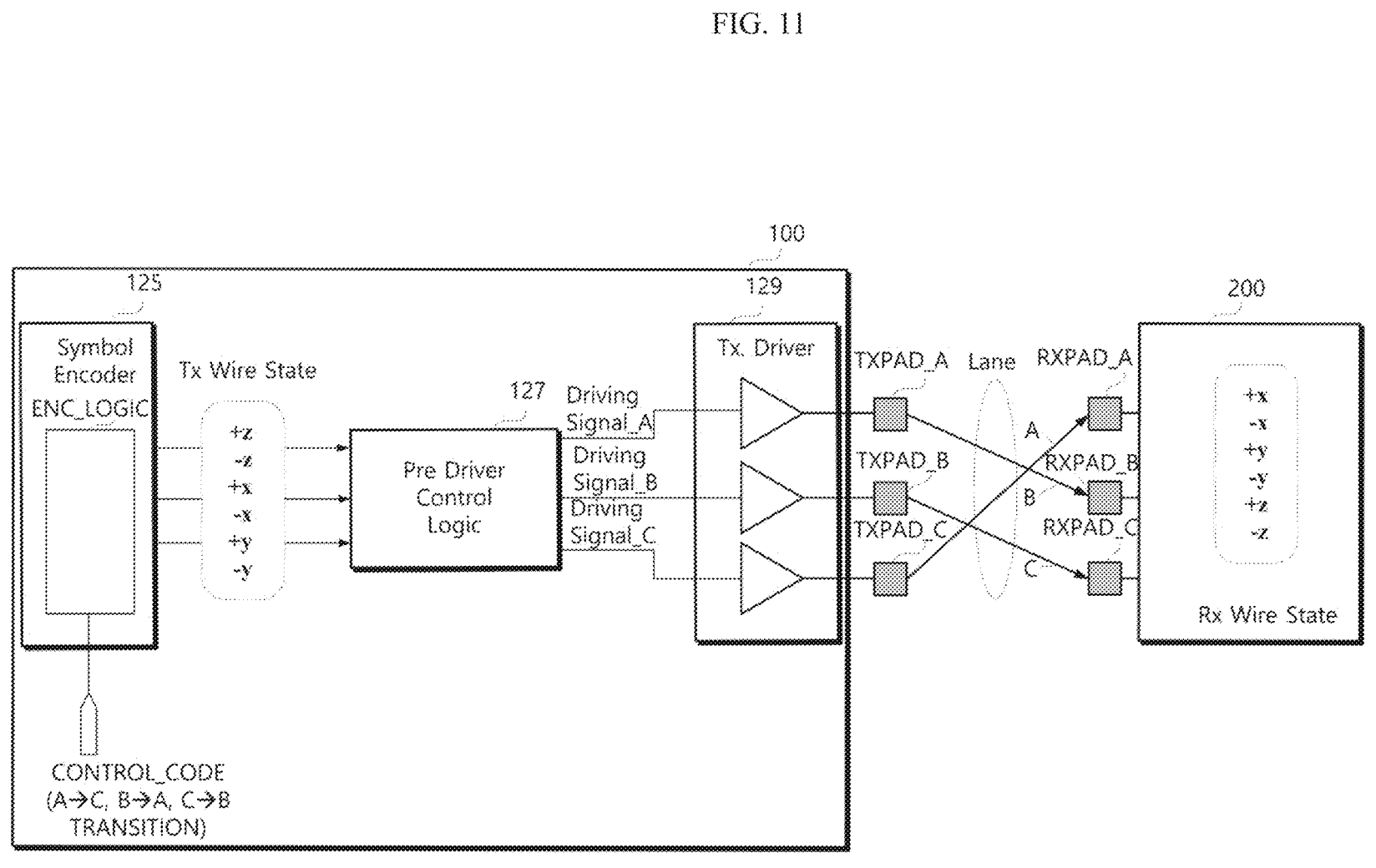

FIGS. 7 to 11 are diagrams illustrating an example of a communication link change of a communication interface circuit according to an example embodiment;

Figure 12:
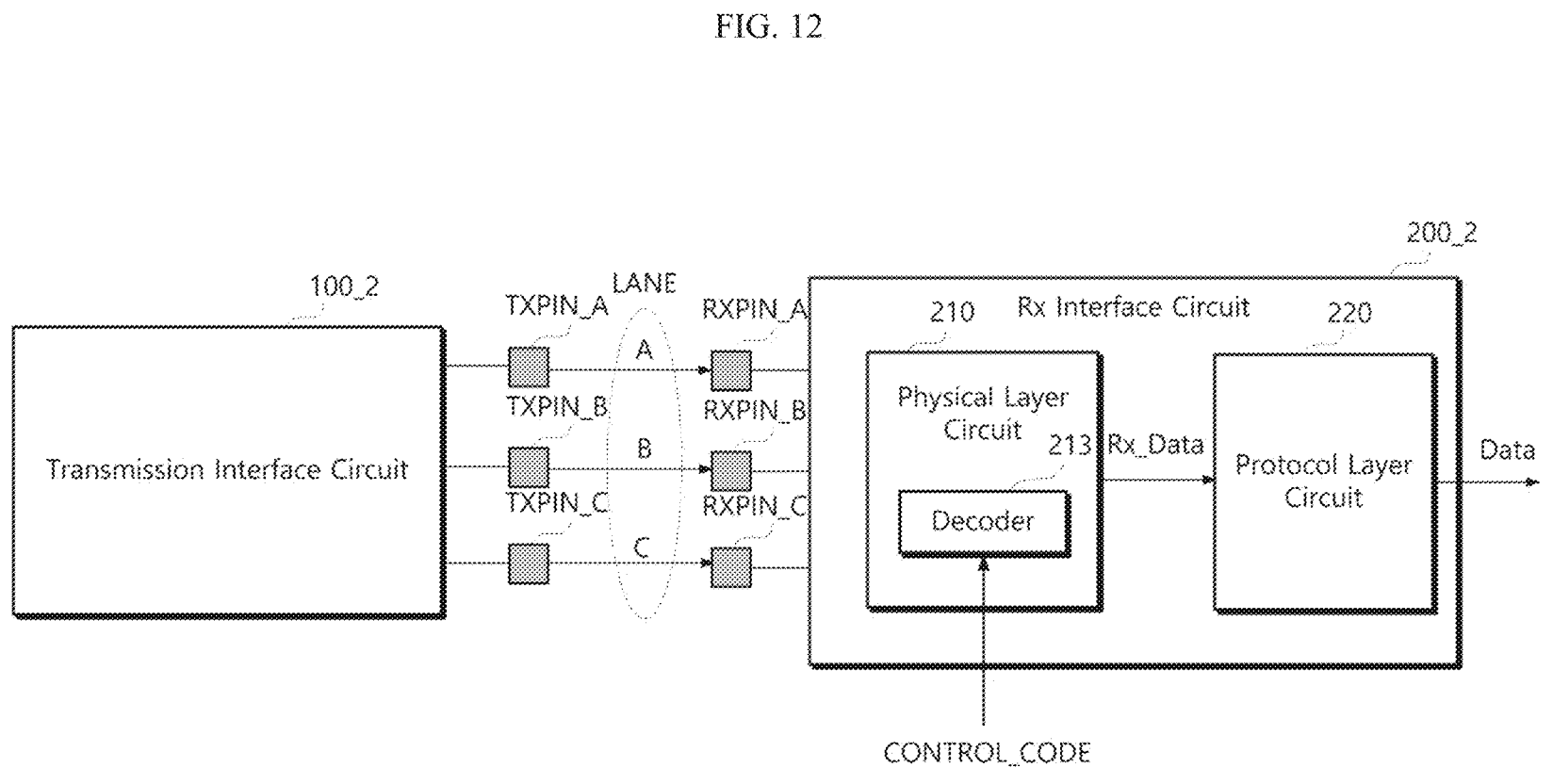

FIG. 12 is a block diagram illustrating a reception-side communication interface circuit according to an example embodiment;

FIG. 13 is a block diagram illustrating a communication interface circuit according to an example embodiment;

DETAILED DESCRIPTION

Hereinafter, example embodiments will be described clearly and in detail so that those skilled in the art can easily carry out example embodiments.

Figure 1:
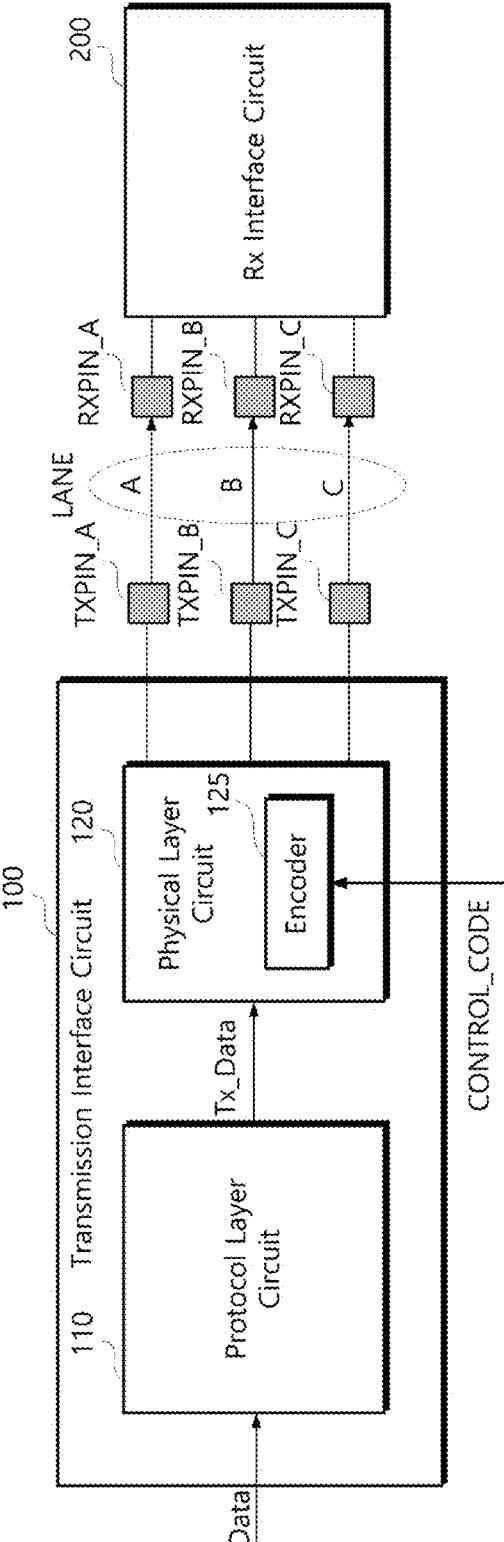
FIG. 1 is a block diagram illustrating a communication interface circuit according to an example embodiment.

FIG. 1 is a block diagram illustrating a transmission-side communication interface circuit according to an example embodiment. For convenience, a transmission-side communication interface circuit will be referred to as a transmission interface circuit, and the reception-side communication interface circuit will be referred to as a reception interface circuit. The communication interface circuit may be operable as one of a transmission interface circuit or a reception interface circuit, or both.

Referring to FIG. 1, a transmission interface circuit 100 includes a protocol layer circuit 110 and a physical layer circuit 120.

The transmission interface circuit 100 may be a communication circuit that transmits data between electronic devices that are internal components of a mobile device, a vehicle, or the like. The internal component may be an image sensing device or a display device. For example, the transmission interface circuit 100 may be used to couple components in a mobile computing device such as a smart phone, a tablet computer, a laptop computer, and the like, a home appliance device such as a refrigerator, camcorder, and the like, a wearable computing device, and a vehicle and a similar device. For example, the transmission interface circuit 100 may be arranged to connect an application processor and an image sensing device of a mobile device.

The transmission interface circuit 100 may be implemented as part of one integrated circuit included in a component. For example, the transmission interface circuit 100 may be implemented as a circuit block of an image sensor of an image sensing device. Alternatively, the transmission interface circuit 100 may be implemented as a circuit block of a display driver IC (DDI) of a display device.

Alternatively, the transmission interface circuit 100 may be implemented as a separate communication chip connected to a component. For example, the transmission interface circuit 100 may be implemented as a communication semiconductor chip such as an application specific integrated circuit (ASIC) or a field programmable gate array (FPGA) to support data exchange between components.

The protocol layer circuit 110 may receive data and generate transmission data Tx_Data in a form of packet data.

The protocol layer circuit 110 may generate a payload based on input data, and insert a header and a footer suitable for transmission before and after the payload, respectively to generate the transmission data Tx_Data in the form of packet data.

According to an example embodiment, the protocol layer circuit 110 may generate the transmission data Tx_Data according to camera serial interface (CSI)-2, display serial interface (DSI) and DSI-2 defined by the mobile industry processor interface (MIPI) alliance.

The transmission data Tx_Data may be provided to the physical layer circuit 120, and the physical layer circuit 120 may encode the transmission data Tx_Data to generate a driving signal. Each communication link is driven at a different signal level based on the driving signal. Data signals may be transmitted through changes in the signal level of the communication link.

The physical layer circuit 120 may transmit a data signal to a reception interface circuit 200 on the receiving side through a data lane LANE. The physical layer circuit 120 may transmit a data signal through at least one data lane LANE. For example, the physical layer circuit 120 may transmit a data signal through a plurality of data lanes.

The physical layer circuit 120 may transmit a data signal through the data lane LANE provided on a plurality of communication links. For example, a plurality of data lanes may be provided on multiple three-phase communication links. The communication link may be called a wire link. Each wire link, also referred to herein as a three-phase wire link, may transmit a signal at one of three distinct levels in a unit interval. For example, each wire link may transmit one among a high level signal HIGH, a middle level signal MID, and a low level signal LOW in one unit interval.

The physical layer circuit 120 may drive a plurality of wire links according to C-PHY defined by the MIPI alliance. For example, the physical layer circuit 120 may include a plurality of line drivers configured to couple a component to three three-phase wire links. The physical layer circuit 120 encodes the transmission data Tx_Data to generate a driving signal. Driving signals may define the signal level of each wire link.

In one unit interval, the signal level state of each wire link of a plurality of wire links providing one data lane LANE is defined as a wire state. Accordingly, one wire state may be transmitted to the reception interface circuit 200 through one data lane LANE every unit interval.

In the present specification, a wire state transmitted in the current unit interval on the same data lane LANE may be called a transmission state. The wire state transmitted in the previous unit interval consecutive to the unit interval in which the transmission state is transmitted may be called a preceding state. Accordingly, the preceding state is transmitted through the data lane LANE, and the transmission state is transmitted through the data lane LANE in the next consecutive unit interval.

The physical layer circuit 120 encodes the transmission data Tx_Data to prevent the same wire state from being continuously transmitted in consecutive unit intervals. The physical layer circuit 120 generates a driving signal such that the signal levels of the three wire links constituting the wire state are different from each other. For example, in a specific unit interval, the signal levels of three wire links transmitting a wire state defined as +x may be the high level signal HIGH, the low level signal LOW, and the middle level signal MID in order. Accordingly, the physical layer circuit 120 may calculate the transmission state with reference to the preceding state. As a result, the physical layer circuit 120 does not continuously output the same wire state. That is, the preceding state and the transmission state transmitted through the same data lane LANE are different from each other.

The physical layer circuit 120 according to an example embodiment includes an encoder 125. The encoder 125 calculates the transmission state based on a preceding state, a symbol and a control code.

The encoder of the physical layer circuit of a conventional communication interface circuit calculates the transmission state based only on the preceding state and symbol. To the contrary, the encoder 125 of the physical layer circuit 120 according to an example embodiment calculates the transmission state based on a control code CONTROL_CODE.

The control code CONTROL_CODE is a code that instructs an encoding change based on the coupling relationship of a plurality of three-phase wire links.

Referring to FIG. 1, a plurality of transmission pins TXPIN_A, TXPIN_B, and TXPIN_C of the transmission interface circuit 100 are electrically coupled to a plurality of reception pins RXPIN_A, RXPIN_B, and RXPIN_C of the reception interface circuit 200, respectively. For example, FIG. 1 illustrates transmission pin A TXPIN_A coupled to reception pin A RXPIN_A, transmission pin B TXPIN_B coupled to reception pin B RXPIN_B, and transmission pin C TXPIN_C coupled to reception pin C RXPIN_C. In this case, based on the reception pins, the wire link between transmission pin A TXPIN_A and reception pin A RXPIN_A may be called wire link A, the wire link between transmission pin B TXPIN_B and reception pin B RXPIN_B may be called wire link B, and the wire link between transmission pin C TXPIN_C and reception pin C RXPIN_C may be called wire link C.

Depending on the coupling settings between components, the coupling relationship between the transmission pins TXPIN_A, TXPIN_B, and TXPIN_C and the reception pins RXPIN_A, RXPIN_B, and RXPIN_C may change. FIG. 1 exemplarily illustrates that transmission pins TXPIN_A, TXPIN_B, and TXPIN_C are sequentially coupled to reception pins RXPIN_A, RXPIN_B, and RXPIN_C, respectively, but the coupling relationship may be changed. For example, the transmission pin A TXPIN_A may be coupled to the reception pin C RXPIN_C, the transmission pin B TXPIN_B may be coupled to the reception pin B RXPIN_B, and the transmission pin C TXPIN_C may be coupled to the reception pin A RXPIN_A. In this case, it may be seen that the wire link A and the wire link C are swapped with each other based on the transmission interface circuit 100, and in this specification, may be referred to as A/C line swapping.

The transmission interface circuit 100 provides a driving signal to each wire link of the data lane LANE based on the coupling relationship of the exchanged wire links. For example, to transmit a wire state defined as +x, the transmission interface circuit 100 drives wire link A coupled to transmission pin A, the wire link B coupled to transmission pin B, and wire link C coupled to transmission pin C with the high level signal HIGH, the low level signal LOW and the middle level signal MID, respectively. When wire link A and wire link C are exchanged, to transmit the wire state defined as +x, the transmission interface circuit 100 may drive wire link C coupled to transmission pin A and wire link B coupled to the transmission pin B, and wire link A coupled to transmission pin C with the middle level signal MID, the low level signal LOW and the high level signal HIGH, respectively.

The encoder 125 of the physical layer circuit 120 according to an example embodiment may perform encoding differently according to swapping between two of the three 3-phase wire links according to C-PHY of MIPI. For example, based on the received control code, the encoder 125 may encode the same symbol into mutually different wire states when swapping wire link A and wire link C, swapping wire link A and wire link B, and swapping wire link B and wire link C.

In addition, the encoder 125 of the physical layer circuit 120 according to an example embodiment may perform encoding differently according to the change of three of the three three-phase wire links according to the C-PHY of the MIPI. For example, based on the provided control code, the encoder 125 may perform encoding appropriately for the coupling relationships changed from wire link A, wire link B and wire link C to wire link B, wire link C and wire link A in order. Alternatively, based on the provided control code, the encoder 125 may perform encoding appropriately for the coupling relationships changed from wire link A, wire link B and wire link C to wire link C, wire link A and wire link B in order.

In an operation of setting up the coupling of components, there is a case where deterioration of signal characteristics according to a communication link and deterioration of signal characteristics according to coupling pad characteristics may be solved by changing the communication link. In addition, it may be required to change a communication link due to the coupling terminal arrangement between components.

Accordingly, the physical layer circuit 120 according to an example embodiment may perform encoding appropriately for the changed coupling relationship of communication links, based on a control code indicating a change in the coupling relationship of communication links. As a result, deterioration of the communication channel may be reduced and data signals may be transmitted stably. In addition, the physical layer circuit 120 may stably transmit data signals by supporting various interconnections between components due to the arrangement of coupling terminals.

Figure 2:
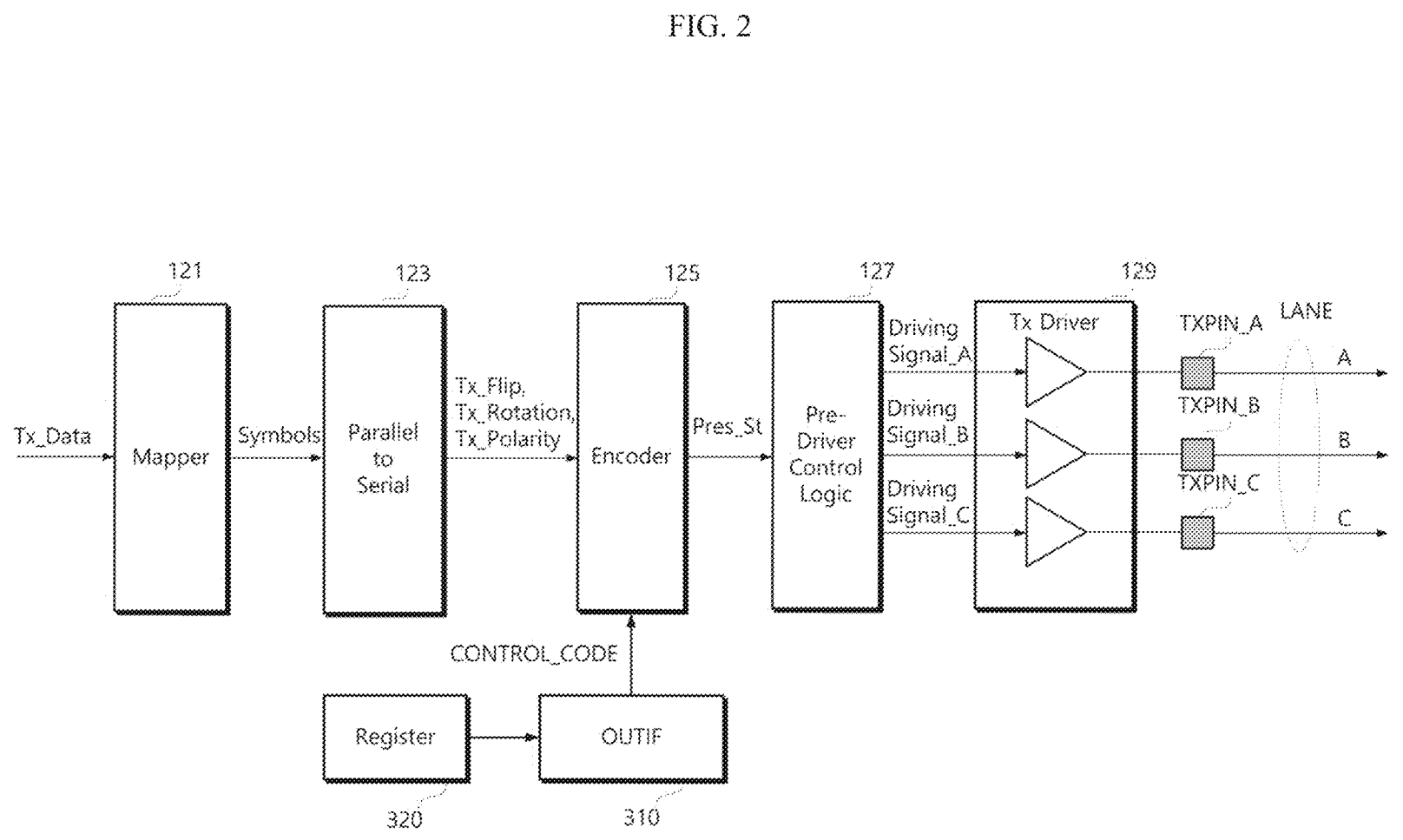

FIG. 2 is a block diagram illustrating in detail the physical layer circuit 120 according to an example embodiment.

Referring to FIG. 2, the physical layer circuit 120 may include a mapping circuit 121, a parallel-to-serial converter 123, the encoder 125, a pre-driver control circuit 127, and a driving driver 129.

FIG. 2 illustrates the transmission pins TXPIN_A, TXPIN_B, and TXPIN_C sequentially coupled to wire link A, wire link B, and wire link C, but the coupling relationship may be changed. For example, the physical layer circuit according to the example embodiment in FIG. 2 may support A/C line swapping in which transmission pin A TXPIN_A is coupled to wire link C, and transmission pin C TXPIN_C is coupled to wire link A. Other types of line swapping of the plurality of wire links may also be supported.

The mapping circuit 121 maps the provided transmission data Tx_Data into symbols. The mapping circuit 121 may receive 16 binary bit data and map it to 7 symbols. The mapping circuit 121 may map 16-bit data to 7 symbols according to the mapping standard defined by the C-PHY of the MIPI. Seven symbols may be provided to the encoder 125 one by one through the parallel-to-serial converter 123.

The parallel-to-serial converter 123 may provide 3 binary bits corresponding to each symbol among the seven symbols to the encoder 125. Each symbol may have one of five forms and be expressed with 3 binary bits. The 3 binary bits of each symbol may indicate the type of transition from the preceding state based on the previous symbol to the transmission state. For example, 3 binary bits may include a flip bit Tx_Flip, a rotation bit Tx_Rotation, and a polarity change bit Tx_Polarity. Each of the flip bit Tx_Flip, rotation bit Tx_Rotation and polarity change bit Tx_Polarity mean a transition type between states. This will be described in detail below with reference to FIGS. 5 and 6.

The encoder 125 according to an example embodiment encodes a symbol composed of 3 binary bits provided based on the preceding state and the control code CONTROL_CODE and outputs a transmission state Pres_St. The transmission state Pres_St may be a wire state that defines the signal levels of three 3-phase wire links according to the C-PHY of the MIPI.

The control code CONTROL_CODE may be stored in a register 320 outside the physical layer circuit 120. The register 320 may store register values for component environment settings. When the component is initiated, a control circuit block OUTIF 320 may read the control code CONTROL_CODE from the register 320 and provide it to the encoder 125. The control code CONTROL_CODE may be stored in the register 320 as different values according to different coupling relationships of the plurality of wire links.

The encoder 125 may encode a symbol appropriately for the coupling relationships of the plurality of wire links based on the provided control code CONTROL_CODE. For example, to transmit wire states of +x, −x, +y, −y, +z and −z according to the C-PHY of the MIPI, the encoder may output the transmission state Pres_St differently depending on the coupling relationships of the plurality of wire links. For example, when the provided control code instructs A/C line swapping, the encoder 125 may output the transmission states Pres_St of −y, +y, −x, +x−z, and +z to transmit wire states of +x, −x, +y, −y, +z and −z according to the C-PHY of the MIPI to the receiver. Similarly, when the provided control code instructs A/B line swapping, the encoder 125 may output the transmission states Pres_St of −x, +x, −z, +z, −y, and +y to transmit wire states of +x, −x, +y, −y, +z and −z according to the C-PHY of the MIPI to the receiver. In addition, when the provided control code indicates B/C line swapping, the encoder 125 may output the transmission states Pres_St of −z, +z, −y, +y, −x, and +x to transmit wire states of +x, −x, +y, −y, +z and −z according to the C-PHY of the MIPI to the receiver.

The pre-driver control circuit 127 provides driving signals DrivingSignal_A, DrivingSignal_B, and DrivingSignal_C to the plurality of driving drivers 129 that drive the plurality of wire links based on the received transmission state Pres_St, respectively. Each driving driver 129 drives the coupled wire link with one of the high level signal HIGH, the middle level signal MID, and the low level signal LOW based on each driving signal DrivingSignal_A, DrivingSignal_B, and DrivingSignal_C.

The driving signals DrivingSignal_A, DrivingSignal_B, and DrivingSignal_C of the pre-driver control circuit 127 according to an example embodiment are directly provided to the plurality of driving drivers 129, respectively.

That is, regardless of the change in the coupling relationship of the plurality of wire links, each of the plurality of driving drivers 129 may drive the coupled wire link based on each driving signal DrivingSignal_A, DrivingSignal_B, and DrivingSignal_C directly provided from the pre-driver control circuit 127. This is due to the fact that the transmission state Pres_St is calculated to be suitable for the changed coupling relationship of the plurality of wire links based on the control code CONTROL_CODE in the encoder 125 according to an example embodiment.

Figure 3:
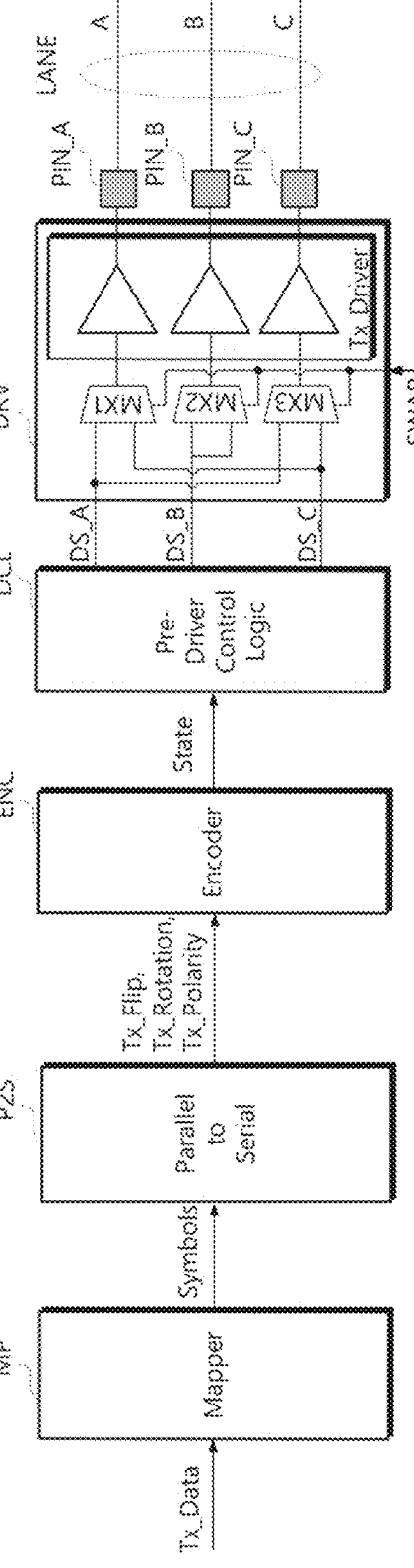
FIG. 3 is a block diagram illustrating a communication interface circuit that supports communication link change based on an analog multiplexer.

Referring to FIG. 3, unlike the encoder 125 according to an example embodiment of the present disclosure, an encoder ENC may output the transmission state State based on the provided symbols (flip bit Tx_Flip, rotation bit Tx_Rotation and polarity change bit Tx_Polarity) without considering the changed coupling relationship of the plurality of wire links. In this case, a plurality of driving drivers Tx_Driver of a driving driver circuit DRV may not directly receive driving signals DS_A, DS_B, and DS_C provided by a pre-driver control circuit DCL. That is, the driving signals DS_A, DS_B, and DS_C are appropriately selected from each of a plurality of analog multiplexers MX1, MX2, and MX3 based on the changed coupling relationship of the plurality of wire links and provided to each driving driver Tx_Driver. In this case, due to the analog multiplexers MX1, MX2, and MX3, the power consumption of the driving driver circuit DRV increases and the area occupied by the driving driver circuit DRV increases. In addition, lines between the plurality of analog multiplexers MX1, MX2, and MX3 and the pre-driver control circuit DCL become very complicated. Accordingly, in reality, a communication interface circuit using the encoder ENC of FIG. 3 may not support various changes in wire links and may only support some changes in wire links.

In contrast, the encoder 125 according to an example embodiment calculates the transmission state Pres_St to be suitable for the changed coupling relationship of the plurality of wire links based on the control code CONTROL_CODE. The pre-driver control circuit 127 may directly provide the plurality of driving signals DrivingSignal_A, DrivingSignal_B, and DrivingSignal_C generated based on the transmission state Pres_St to each of the plurality of driving drivers 129.

Figure 4:
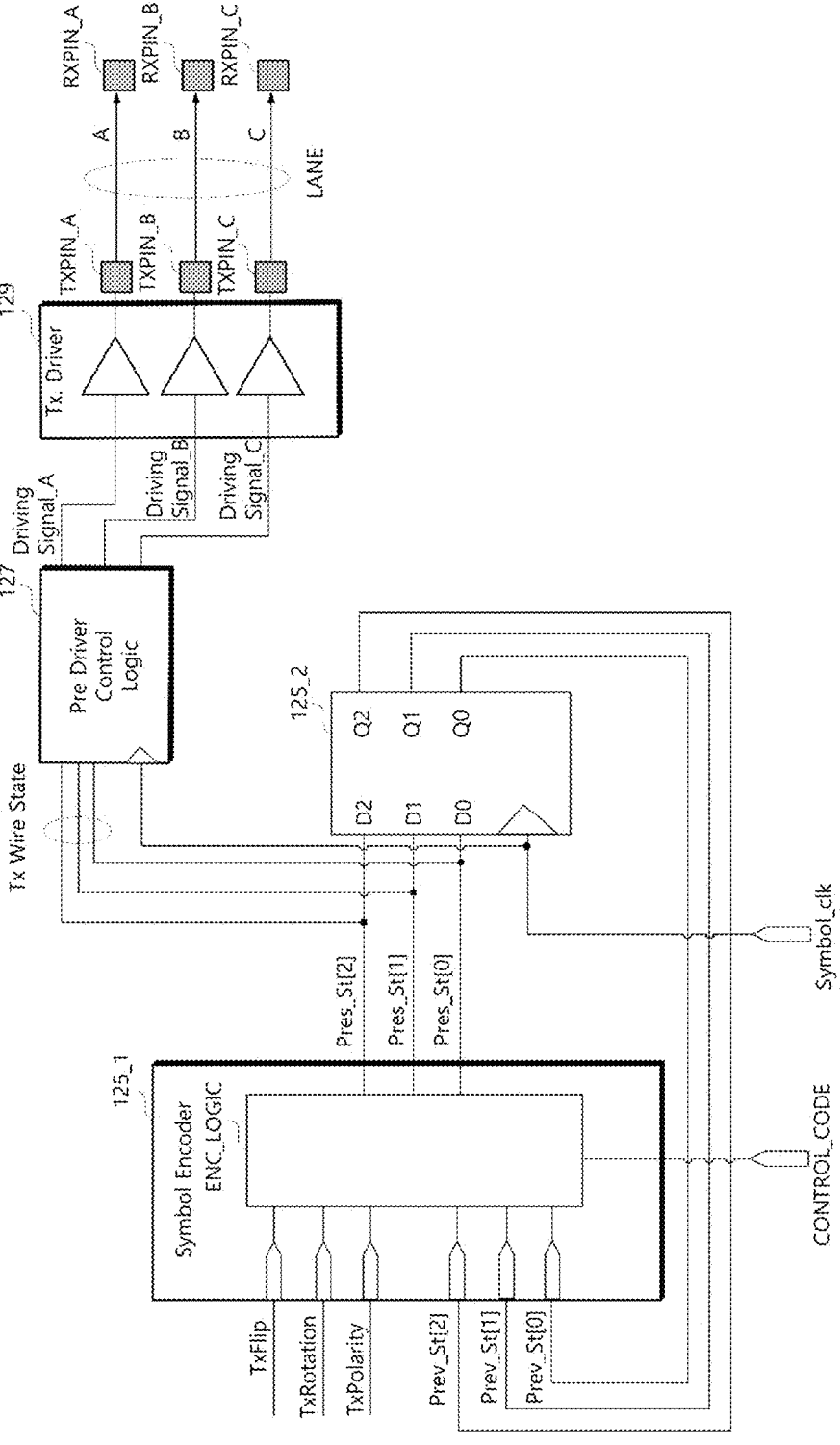
FIG. 4 is a circuit diagram of a communication interface circuit according to an example embodiment.

FIG. 4 is a block diagram showing in detail the encoder 125 according to the example embodiment of FIG. 2.

Referring to FIG. 4, the encoder 125 may include a symbol encoder 125_1 and a flip-flop circuit 125_2.

FIG. 4 illustrates the transmission pins TXPIN_A, TXPIN_B, and TXPIN_C sequentially coupled to the reception pins RXPIN_A, RXPIN_B, and RXPIN_C, but the coupling relationship may be changed.

The symbol encoder 125_1 receives a symbol composed of 3 binary bits. The 3 binary bits of the symbol may include the flip bit Tx_Flip, the rotation bit Tx_Rotation, and the polarity change bit Tx_Polarity. Each binary bit of the symbol may instruct the state transition from a preceding state Prev_St to the transmission state Pres_St.

The symbol encoder 125_1 according to an example embodiment encodes a symbol based on the preceding state Prev_St and the control code CONTROL_CODE and outputs the transmission state Pres_St.

The control code CONTROL_CODE may instruct an encoding change based on the coupling relationship of the plurality of wire links in which the data lane LANE is provided. For example, the control code CONTROL_CODE may instruct encoding based on A/C line swapping, B/C line swapping, and A/B line swapping. The control code CONTROL_CODE may instruct encoding based on changing A/B/C lines to B/C/A lines or changing A/B/C lines to C/A/B lines, respectively.

The transmission state Pres_St[0], Pres_St[1], and Pres_St[2] output by the symbol encoder 125_1 may be provided to the flip-flop circuit 125_2 and the pre-driver control circuit 127.

The flip-flop circuit 125_2 and the pre-driver control circuit 127 operate based on the same clock signal Symbol_Clk. The flip-flop circuit 125_2 may store the transmission state Pres_St[0], Pres_St[1], and Pres_St[2] provided in the first unit interval. The flip-flop circuit 125_2 may provide the transmission state Pres_St[0], Pres_St[1], and Pres_St[2] received in the first unit interval to the symbol encoder 125_1 in the second unit interval, which is the next unit interval consecutive to the first unit interval, as the preceding state Prev_St[0], Prev_St[1], and Prev_St[2].

The pre-driver control circuit 127 according to an example embodiment may directly provide the plurality of driving signals DrivingSignal_A, DrivingSignal_B, and DrivingSignal_C, which are generated based on the received transmission state Pres_St[0], Pres_St[1], and Pres_St[2], to the plurality of driving drivers 129.

The driving voltage level of each wire link driven based on the transmission state Pres_St[0], Pres_St[1] and Pres_St[2] may be as shown in Table 1. The driving voltage level of each wire link in Table 1 assumes that there is no swapping or change of the A/B/C lines.

TABLE 1

| VA | VB | VC | Tx Wire State | Rx Wire State |
|---|---|---|---|---|
| HIGH | LOW | MIDDLE | +x | +x |
| LOW | HIGH | MIDDLE | −x | −x |
| MIDDLE | HIGH | LOW | +y | +y |
| MIDDLE | LOW | HIGH | −y | −y |
| LOW | MIDDLE | HIGH | +z | +z |
| HIGH | MIDDLE | LOW | −z | −z |

The high level signal HIGH, the middle level signal MID, and the low level signal LOW may be signals having voltages of 4/3, 1/2, and 1/4 of a reference voltage, respectively.

The encoder 125_1 according to an example embodiment may include encoding logic ENC_LOGIC. The encoding logic ENC_LOGIC encodes a symbol based on the preceding state Prev_St and the control code CONTROL_CODE and outputs the transmission state Pres_St. When the control code CONTROL_CODE instructs not to exchange or change the A/B/C lines, the encoding logic ENC_LOGIC may perform encoding based on a state diagram as shown in FIG. 5.

Figure 5:
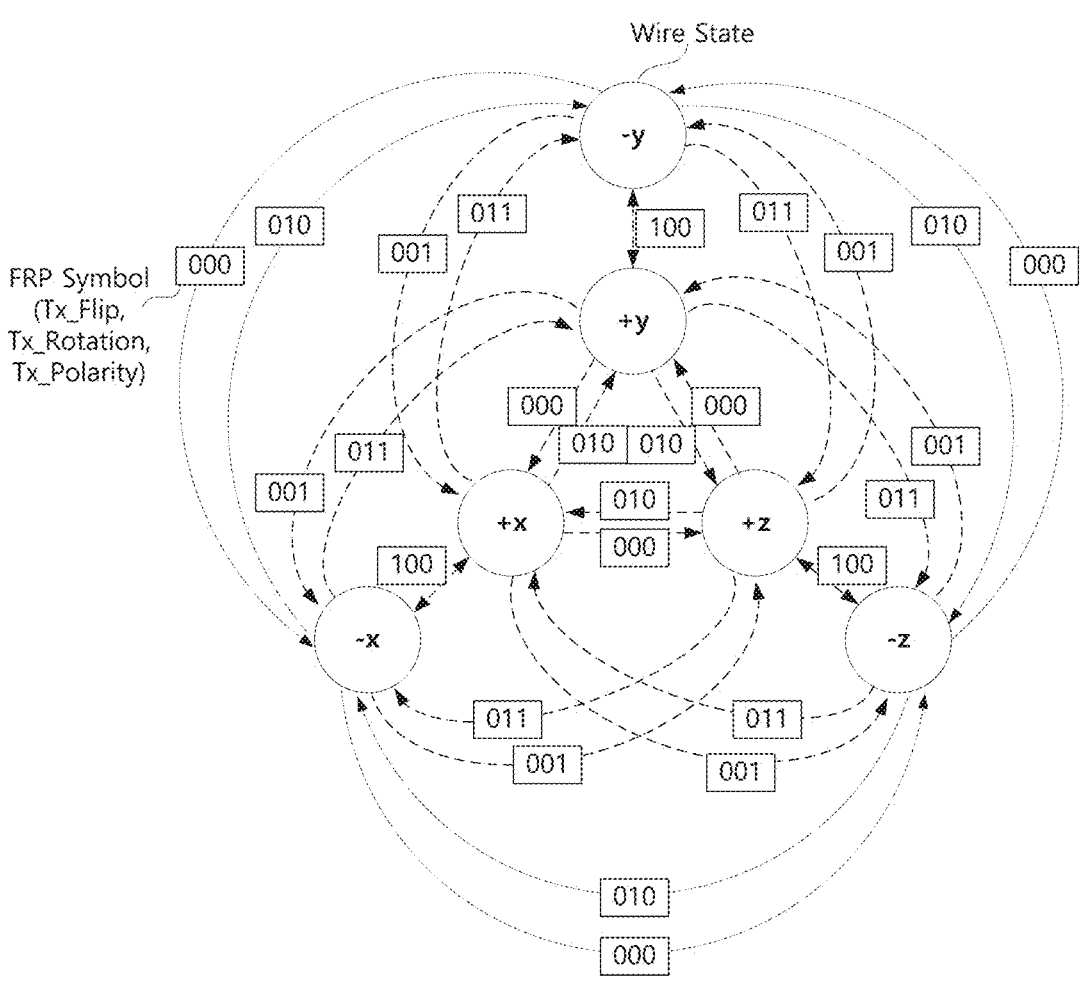
FIGS. 5 and 6 are diagrams illustrating a state diagram by encoding of a communication interface circuit according to an example embodiment.

Referring to FIG. 5, the transition between 6 wire states is shown by a symbol FRP_Symbol expressed with 3 binary bits. For example, wire state '−y' may be transitioned to wire state '−x' by symbol '000'. Therefore, when the control code CONTROL_CODE instructs not to exchange or change the A/B/C lines, the preceding state Prev_St is '−y', and the provided symbol is '000', the encoding logic ENC_LOGIC may output the transmission state Pres_St as '−x'.

Referring to FIG. 5, when the control code CONTROL_CODE instructs not to exchange or change A/B/C lines, the encoding logic ENC_LOGIC maintains the polarity and the preceding state Prev_St based on the symbol of '000' represented by 3 binary bits, and outputs the transmission state Pres_St that reduces characters by one level. The increasing number of characters of the wire state will be described in the increasing order of letters in the alphabet. Therefore, in the state diagram of FIG. 5, the symbol '000' transitions by rotating counterclockwise from the preceding state Prev_St. The encoding logic ENC_LOGIC changes the polarity of the preceding state Prev_St based on the symbol '001' and outputs the transmission state Pres_St with the character reduced by one level. The encoding logic ENC_LOGIC maintains the polarity of the preceding state Prev_St based on the symbol '010' and outputs the transmission state Pres_St with the character increased by one level. The encoding logic ENC_LOGIC changes the polarity of the preceding state Prev_St based on the symbol '011' and outputs the transmission state Pres_St with the character increased by one level.

That is, in the state diagram of FIG. 5, when the rotation bit Tx_Rotation of the symbol FRP_Symbol expressed in 3 binary bits is '0', the encoding logic ENC_LOGIC calculates the transmission state Pres_St by rotating in the direction of decreasing characters from the preceding state Prev_St. When the rotation bit Tx_Rotation is '1', the encoding logic ENC_LOGIC calculates the transmission state Pres_St by rotating in the direction of increasing characters from the preceding state Prev_St.

In the state diagram of FIG. 5, the operation of the encoding logic ENC_LOGIC according to the flip bit Tx_Flip, rotation bit Tx_Rotation, and polarity change bit Tx_Polarity of the symbol FRP_Symbol expressed in 3 binary bits is performed according to Table 2.

TABLE 2

| Bit | Tx_Flip | Tx_Rotation | Tx_Polarity |
|---|---|---|---|
| 0 | — | Decrease letter. | — |
| 1 | Same letter, toggle sign. | Increase letter. | Toggle sign. |

Figure 6:
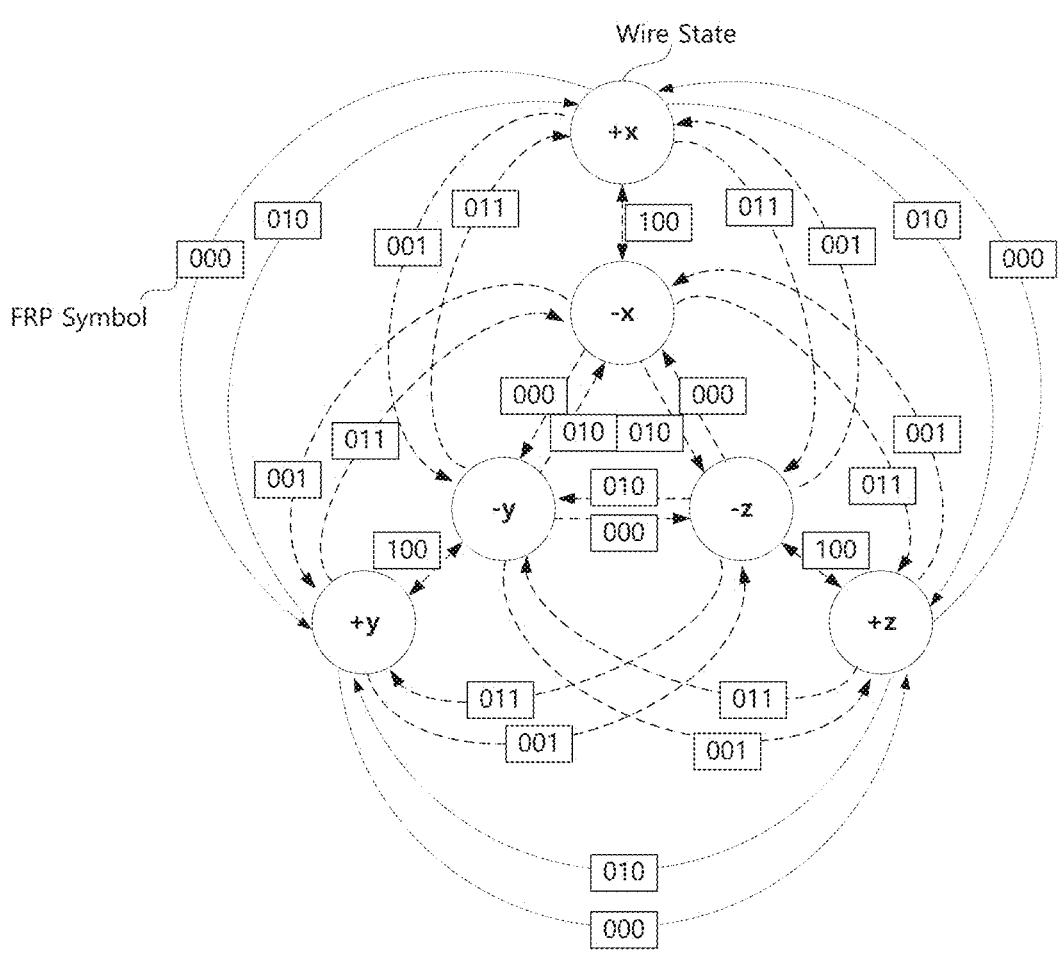

When the control code CONTROL_CODE instructs exchange of two lines of the A/B/C lines, the encoding logic ENC_LOGIC according to an example embodiment may calculate the transmission state Pres_St according to the state diagram of FIG. 6.

For example, the encoding logic ENC_LOGIC maintains the polarity in the preceding state Prev_St based on the symbol '000' and outputs the transmission state Pres_St with the character increased by one level. The encoding logic ENC_LOGIC changes the polarity in the preceding state Prev_St based on the symbol '001' and outputs the transmission state Pres_St with the character increased by one level. The encoding logic ENC_LOGIC maintains the polarity in the preceding state Prev_St based on the symbol '010' and outputs the transmission state Pres_St with the character reduced by one level. The encoding logic ENC_LOGIC changes the polarity in the preceding state Prev_St based on the symbol '011' and outputs the transmission state Pres_St with the character reduced by one level.

That is, in the state diagram of FIG. 6 when the rotation bit Tx_Rotation of the symbol FRP_Symbol expressed in 3 binary bits is '0', the encoding logic ENC_LOGIC calculates the transmission state Pres_St by rotating in the direction of increasing characters from the preceding state Prev_St. When the rotation bit Tx_Rotation is '1', the encoding logic ENC_LOGIC calculates the transmission state Pres_St by rotating in the direction of decreasing characters from the preceding state Prev_St.

In the state diagram of FIG. 6, the operation of the encoding logic ENC_LOGIC according to the flip bit Tx_Flip, rotation bit Tx_Rotation, and polarity change bit Tx_Polarity of the symbol FRP_Symbol expressed in 3 binary bits is performed according to Table 3.

TABLE 3

| Bit | Tx_Flip | Tx_Rotation | Tx_Polarity |
|---|---|---|---|
| 0 | — | Increase letter. | — |
| 1 | Same letter, toggle sign. | Decrease letter. | Toggle sign. |

Figure 7:
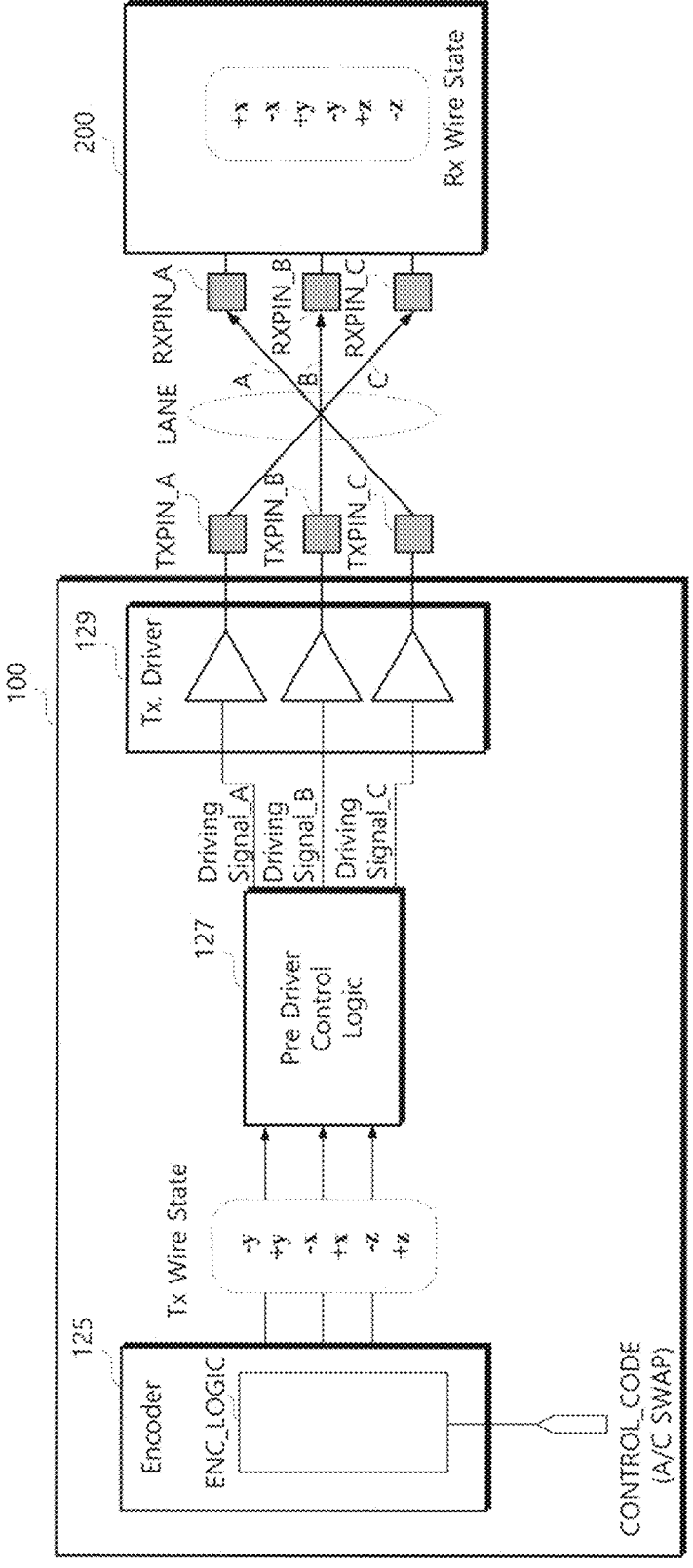

FIG. 7 is a block diagram illustrating an operation according to A/C line swapping of the transmission interface circuit 100 according to an example embodiment. Detailed descriptions of parts that overlap or are similar to the descriptions with reference to FIGS. 1 to 6 will be omitted.

Referring to FIG. 7, the transmission interface circuit 100 may include the encoder 125, the pre-driver control circuit 127, and the driving driver 129. The encoder 125, pre-driver control circuit 127, and the driving driver 129 may be the same as those in FIGS. 2 and 4.

The transmission pins TXPIN_A, TXPIN_B, and TXPIN_C, of the transmission interface circuit 100 are sequentially coupled to the reception pins RXPIN_C, RXPIN_B, and RXPIN_A of the reception interface circuit 200. That is, line A and line C on the plurality of wire links providing the data lane LANE are exchanged and coupled.

The encoding logic ENC_LOGIC of the encoder 125 according to an example embodiment may be provided with the control code CONTROL_CODE that instructs encoding based on A/C line swapping.

Based on the control code CONTROL_CODE, the encoding logic ENC_LOGIC may encode the symbol to output the transmission state as −y, +y, −x, +x, −z, and +z, corresponding to reception of the wire state Rx_Wire_State of +x, −x, +y, −y, +z, and −z based on the C-PHY of the MIPI of the reception interface circuit 200. The transmission interface circuit 100 according to the example embodiment of FIG. 7 may calculate the transmission state Tx_Wire_State based on the state diagram described with reference to FIG. 6.

The pre-driver control circuit 127 may generate the plurality of driving signals DrivingSignal_A, DrivingSignal_B, and DrivingSignal_C based on the transmission state Tx Wire State output from the encoder 125, and provide the driving signals to the plurality of driving drivers 129, respectively.

The driving voltage level of each wire link driven based on the transmission state Tx_Wire_State may be dependent on the transmitted wire state as shown in Table 4.

TABLE 4

| VA | VB | VC | Tx Wire State | Rx Wire State |
|---|---|---|---|---|
| MIDDLE | LOW | HIGH | −y | +x |
| MIDDLE | HIGH | LOW | +y | −x |
| LOW | HIGH | MIDDLE | −x | +y |
| HIGH | LOW | MIDDLE | +x | −y |
| HIGH | MIDDLE | LOW | −z | +z |
| LOW | MIDDLE | HIGH | +z | −z |

For example, based on the control code CONTROL_CODE that instructs encoding based on A/C line swapping, the encoder 125 may encode the symbol and output the transmission state Tx_Wire_State of '−y'. The middle level signal MID, low level signal LOW, and high level signal HIGH are sequentially driven in the wire links respectively coupled to the transmission pins TXPIN_A, TXPIN_B, and TXPIN_C. Due to the A/C line swapping, the reception interface circuit 200 may sequentially receive the high level signal HIGH, the low level signal LOW, and the middle level signal MID from line A, line B, and line C, respectively, and decode them as the reception wire state Rx_Wire_State of '+x'.

Figure 8:
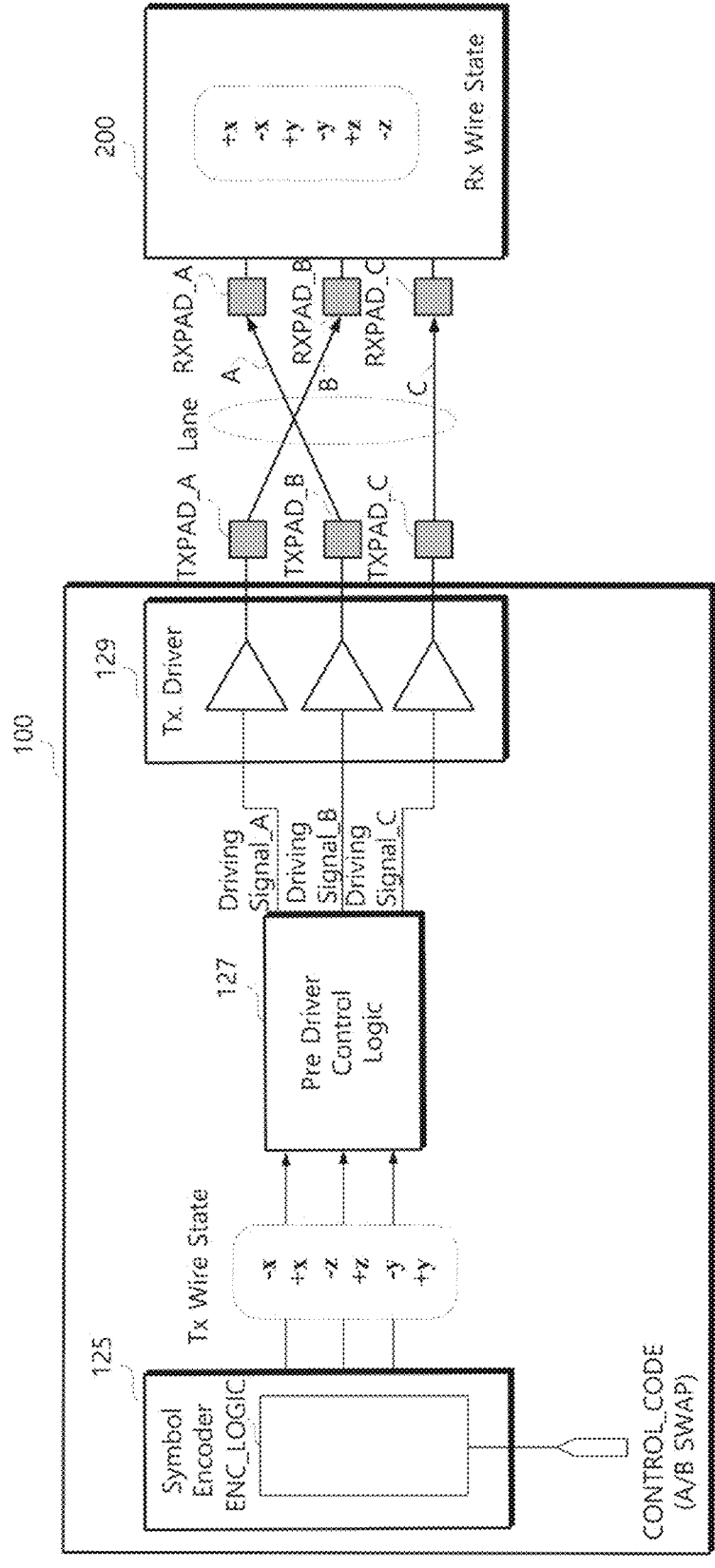

FIG. 8 is a block diagram illustrating an operation according to A/C line swapping of the transmission interface circuit 100 according to an example embodiment. Detailed descriptions of parts that overlap or are similar to the descriptions with reference to FIGS. 1 to 7 will be omitted.

Referring to FIG. 8, the transmission interface circuit 100 may include the encoder 125, the pre-driver control circuit 127, and the driving driver 129. The encoder 125, pre-driver control circuit 127, and the driving driver 129 may be the same as those in FIGS. 2 and 4.

The transmission pins TXPIN_A, TXPIN_B, and TXPIN_C of the transmission interface circuit 100 are sequentially coupled to the reception pins RXPIN_B, RXPIN_A, and RXPIN_C of the reception interface circuit 200. That is, line A and line C on the plurality of wire links providing the data lane LANE are exchanged and coupled.

The encoding logic ENC_LOGIC of the encoder 125 according to an example embodiment may be provided with the control code CONTROL_CODE that instructs encoding based on A/B line swapping.

Based on the control code CONTROL_CODE, the encoding logic ENC_LOGIC may encode the symbol to output the transmission state as −x, +x, −z, +z, −y, and +y, corresponding to reception of the wire state Rx_Wire_State of +x, −x, +y, −y, +z, and −z based on the C-PHY of the MIPI of the reception interface circuit 200. The transmission interface circuit 100 according to the example embodiment of FIG. 8 may calculate the transmission state Tx_Wire_State based on the state diagram described with reference to FIG. 6.

The driving voltage level of each wire link driven based on the transmission state Tx_Wire_State may be dependent on the transmitted wire state as shown in Table 5.

TABLE 5

| VA | VB | VC | Tx Wire State | Rx Wire State |
|---|---|---|---|---|
| LOW | HIGH | MIDDLE | −x | +x |
| HIGH | LOW | MIDDLE | +x | −x |
| HIGH | MIDDLE | LOW | −z | +y |
| LOW | MIDDLE | HIGH | +z | −y |
| MIDDLE | LOW | HIGH | −y | +z |
| MIDDLE | HIGH | LOW | +y | −z |

For example, based on the control code CONTROL_CODE that instructs encoding based on A/B line swapping, the encoder 125 may encode the symbol and output the transmission state Tx_Wire_State of '−x'. The low level signal LOW, high level signal HIGH, and middle level signal MID are sequentially driven in the wire links respectively coupled to the transmission pins TXPIN_A, TXPIN_B, and TXPIN_C. Due to the A/B line swapping, the reception interface circuit 200 may sequentially receive the high level signal HIGH, the low level signal LOW, and the middle level signal MID from line A, line B, and line C, respectively, and decode them as the reception wire state Rx_Wire_State of '+x'.

Figure 9:
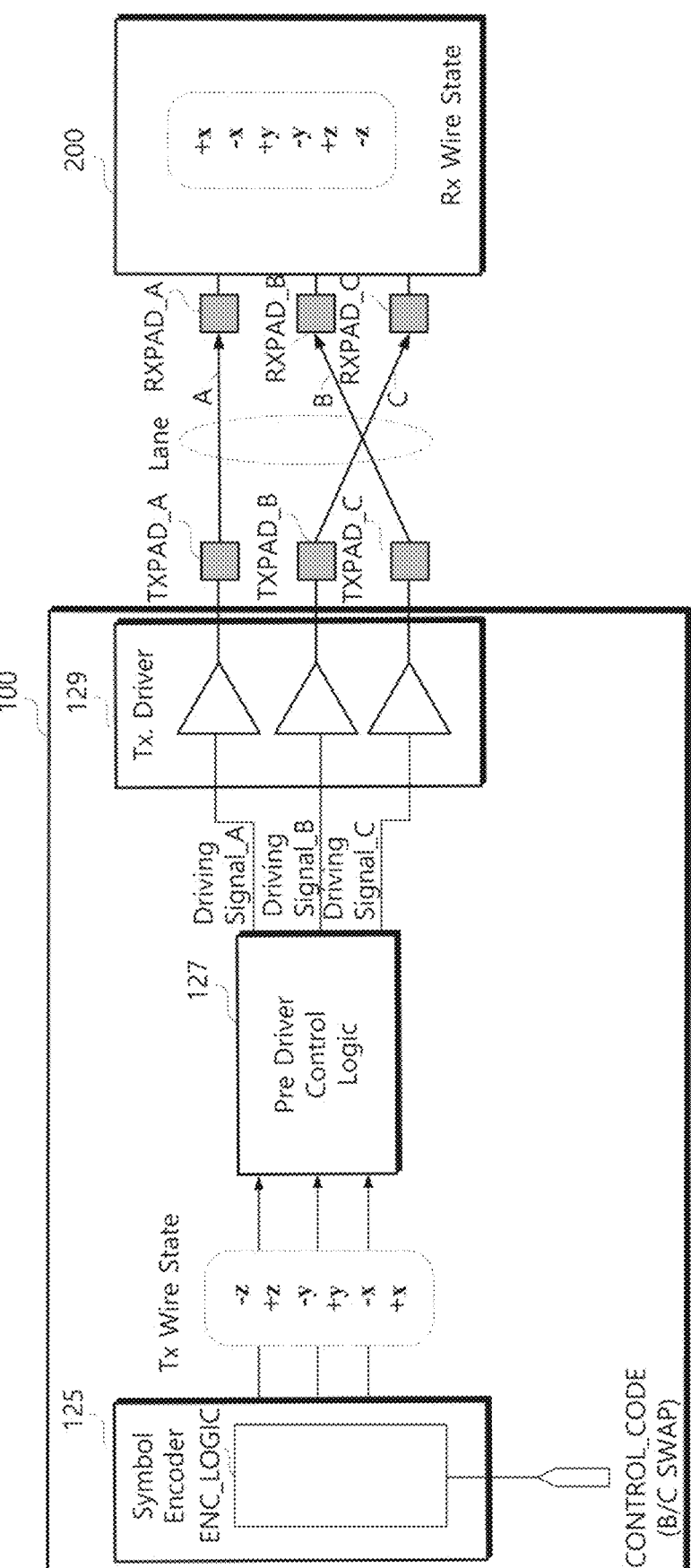

FIG. 9 is a block diagram illustrating an operation according to B/C line swapping of the transmission interface circuit 100 according to an example embodiment. Detailed descriptions of parts that overlap or are similar to the descriptions with reference to FIGS. 1 to 8 will be omitted.

Referring to FIG. 9, the transmission interface circuit 100 may include the encoder 125, the pre-driver control circuit 127, and the driving driver 129. The encoder 125, pre-driver control circuit 127, and the driving driver 129 may be the same as those in FIGS. 2 and 4.

The transmission pins TXPIN_A, TXPIN_B, and TXPIN_C of the transmission interface circuit 100 are sequentially coupled to the reception pins RXPIN_A, RXPIN_C, and RXPIN_B of the reception interface circuit 200. That is, line B and line C on the plurality of wire links providing the data lane LANE are exchanged and coupled.

The encoding logic ENC_LOGIC of the encoder 125 according to an example embodiment may be provided with the control code CONTROL_CODE that instructs encoding based on B/C line swapping.

Based on the control code CONTROL_CODE, the encoding logic ENC_LOGIC may encode the symbol to output the transmission state as −z, +z, −y, +y, −x, and +x, corresponding to reception of the wire state Rx_Wire_State of +x, −x, +y, −y, +z, and −z based on the C-PHY of the MIPI of the reception interface circuit 200. The transmission interface circuit 100 according to the example embodiment of FIG. 9 may calculate the transmission state Tx_Wire_State based on the state diagram described with reference to FIG. 6.

The driving voltage level of each wire link driven based on the transmission state Tx_Wire_State may be dependent on the transmitted wire state as shown in Table 6.

TABLE 6

| VA | VB | VC | Tx Wire State | Rx Wire State |
|---|---|---|---|---|
| HIGH | MIDDLE | LOW | −z | +x |
| LOW | MIDDLE | HIGH | +z | −x |
| MIDDLE | LOW | HIGH | −y | +y |
| MIDDLE | HIGH | LOW | +y | −y |
| LOW | HIGH | MIDDLE | −x | +z |
| HIGH | LOW | MIDDLE | +x | −z |

For example, based on the control code CONTROL_CODE that instructs encoding based on B/C line swapping, the encoder 125 may encode the symbol and output the transmission state Tx_Wire_State of '−z'. The high level signal HIGH, middle level signal MID, and low level signal LOW are sequentially driven in the wire links respectively coupled to the transmission pins TXPIN_A, TXPIN_B, and TXPIN_C. Due to the B/C line swapping, the reception interface circuit 200 may sequentially receive the high level signal HIGH, the low level signal LOW, and the middle level signal MID from line A, line B, and line C, respectively, and decode them as the reception wire state Rx_Wire_State of '+x'.

Figure 10:
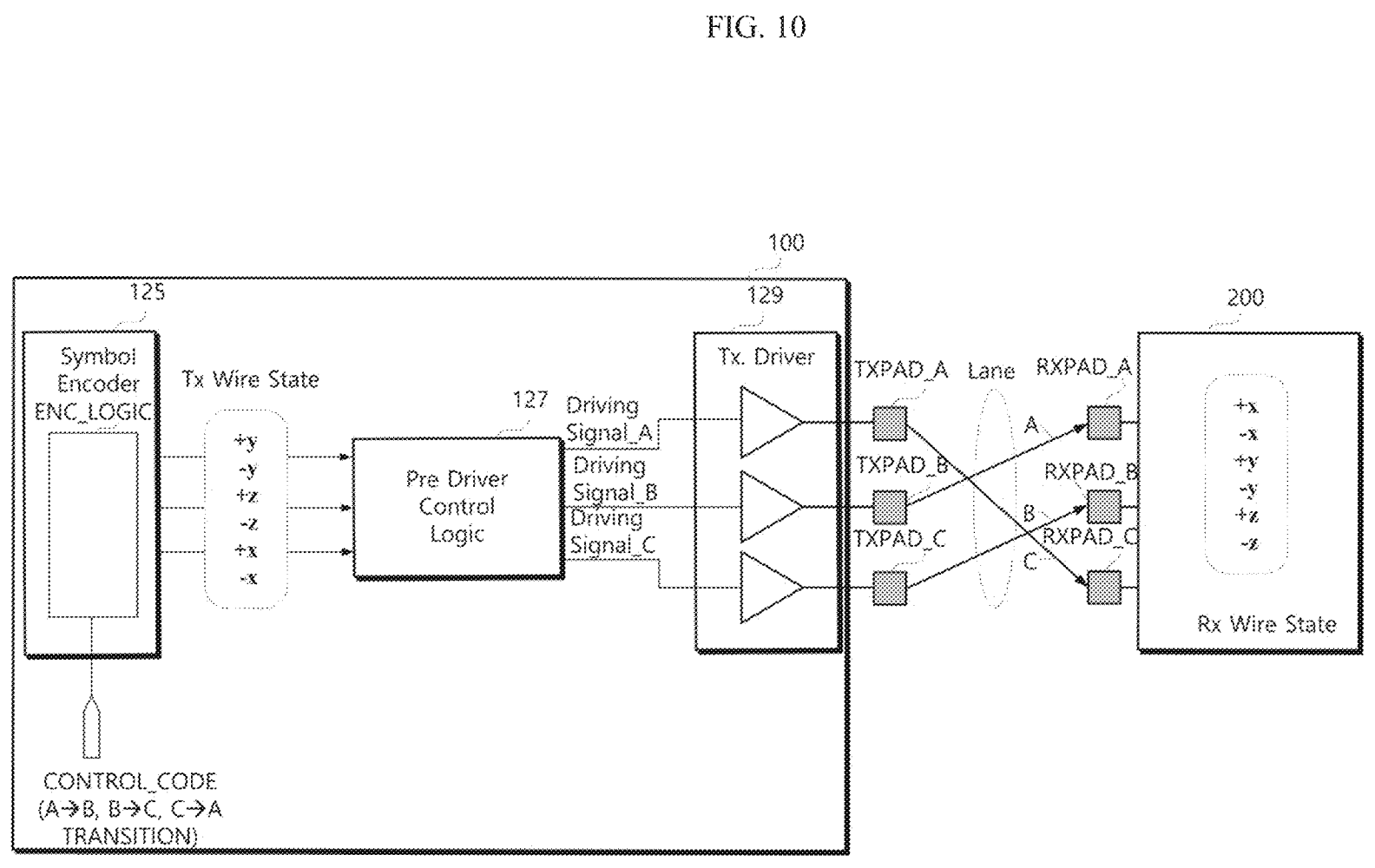

FIG. 10 is a block diagram illustrating an operation of sequentially changing line A, line B, and line C to line B, line C, and line A by the transmission interface circuit 100 according to an example embodiment. Detailed descriptions of parts that overlap or are similar to the descriptions with reference to FIGS. 1 to 9 will be omitted.

The transmission pins TXPIN_A, TXPIN_B, and TXPIN_C of the transmission interface circuit 100 are sequentially coupled to the reception pins RXPIN_C, RXPIN_A, and RXPIN_B of the reception interface circuit 200. That is, line A, line B, and line C on the plurality of wire links providing the data lane LANE are changed and coupled to line B, line C, and line C, respectively.

The encoding logic ENC_LOGIC of the encoder 125 according to an example embodiment may receive the control code CONTROL_CODE that instructs encoding based on the change from line A, line B and line C to line B, line C and line A in order.

Based on the control code CONTROL_CODE, the encoding logic ENC_LOGIC may encode the symbol to output the transmission state as +y, −y, +z, −z, +x and −x, corresponding to reception of the wire state Rx_Wire_State of +x, −x, +y, −y, +z, and −z based on the C-PHY of the MIPI of the reception interface circuit 200. The transmission interface circuit 100 according to the example embodiment of FIG. 10 may calculate the transmission state Tx_Wire_State based on the state diagram described with reference to FIG. 5.

That is, the wire state transition form when line A line B and line C are changed to line B, line C and line A, respectively is different from the wire state transition form when two of line A, line B and line C are exchanged.

The driving voltage level of each wire link driven based on the transmission state Tx_Wire_State may be dependent on the transmitted wire state as shown in Table 7.

TABLE 7

| VA | VB | VC | Tx Wire State | Rx Wire State |
|---|---|---|---|---|
| MIDDLE | HIGH | LOW | +y | +x |
| MIDDLE | LOW | HIGH | −y | −x |
| LOW | MIDDLE | HIGH | +z | +y |
| HIGH | MIDDLE | LOW | −z | −y |
| HIGH | LOW | MIDDLE | +x | +z |
| LOW | HIGH | MIDDLE | −x | −z |

For example, based on the control code CONTROL_CODE that instructs encoding based on the fact that line A, line B, and line C are changed to line B, line C, and line A, respectively, the encoder 125 may encode the symbol and output the transmission state Tx_Wire_State of '−y'. The middle level signal MID, high level signal HIGH, and low level signal MID are sequentially driven in the wire links respectively coupled to the transmission pins TXPIN_A, TXPIN_B, and TXPIN_C. Due to the changes from line A, line B, and line C to line B, line C, and line A in order, the reception interface circuit 200 may sequentially receive the high level signal HIGH, the low level signal LOW, and the middle level signal MID from line A, line B, and line C, respectively, and decode them as the reception wire state Rx_Wire State of '+x'.

FIG. 11 is a block diagram illustrating an operation of sequentially changing line A, line B, and line C to line C, line A, and line B by the transmission interface circuit 100 according to an example embodiment. Detailed descriptions of parts that overlap or are similar to the descriptions with reference to FIGS. 1 to 10 will be omitted.

The transmission pins TXPIN_A, TXPIN_B, and TXPIN_C of the transmission interface circuit 100 are sequentially coupled to the reception pins RXPIN_B, RXPIN_C, and RXPIN_A of the reception interface circuit 200. That is, line A, line B, and line C on the plurality of wire links providing the data lane LANE are changed and coupled to line C, line A, and line B, respectively.

The encoding logic ENC_LOGIC of the encoder 125 according to an example embodiment may receive the control code CONTROL_CODE that instructs encoding based on the change from line A, line B, and line C to line C, line A, and line B in order.

Based on the control code CONTROL_CODE, the encoding logic ENC_LOGIC may encode the symbol to output the transmission state as +z, −z, +x, −x, +y and −y, corresponding to reception of the wire state Rx_Wire_State of +x, −x, +y, −y, +z and −z based on the C-PHY of the MIPI of the reception interface circuit 200. The transmission interface circuit 100 according to the example embodiment of FIG. 11 may calculate the transmission state Tx_Wire_State based on the state diagram described with reference to FIG. 5.

That is, the wire state transition form when line A, line B, and line C are changed to line C, line A, and line B, respectively is different from the wire state transition form when two of line A, line B, and line C are exchanged.

The driving voltage level of each wire link driven based on the transmission state Tx_Wire_State may be dependent on the transmitted wire state as shown in Table 8.

TABLE 8

| VA | VB | VC | Tx Wire State | Rx Wire State |
|---|---|---|---|---|
| LOW | MIDDLE | HIGH | +z | +x |
| HIGH | MIDDLE | LOW | −z | −x |
| HIGH | LOW | MIDDLE | +x | +y |
| LOW | HIGH | MIDDLE | −x | −y |
| MIDDLE | HIGH | LOW | +y | +z |
| MIDDLE | LOW | HIGH | −y | −z |

For example, based on the control code CONTROL_CODE that instructs encoding based on the fact that line A, line B, and line C are changed to line C, line A, and line B, respectively, the encoder 125 may encode the symbol and output the transmission state Tx_Wire State of '+z'. The low level signal LOW, middle level signal MID, and high level signal HIGH are sequentially driven in the wire links respectively coupled to the transmission pins TXPIN_A, TXPIN_B, and TXPIN_C. Due to the changes from line A, line B, and line C to line C, line A, and line B in order, the reception interface circuit 200 may sequentially receive the high level signal HIGH, the low level signal LOW, and the middle level signal MID from line A, line B, and line C, respectively, and decode them as the reception wire state Rx_Wire_State of '+x'.

FIG. 12 is a block diagram illustrating a reception-side communication interface circuit according to an example embodiment. Detailed descriptions of parts that overlap or are similar to the descriptions with reference to FIGS. 1 to 11 will be omitted.

Referring to FIG. 12, a reception interface circuit 200_2 may include a physical layer circuit 210 and a protocol layer circuit 220.

The physical layer circuit 210 may receive a data signal from the transmission interface circuit 100 on a transmission side through the data lane LANE. The physical layer circuit 210 may receive a data signal through at least one data lane
LANE. For example, the physical layer circuit 210 may
receive a data signal through the plurality of data lanes. For
reference, FIG. 1 is explained assuming one data lane
LANE.

The physical layer circuit 210 may receive a reception
state through the data lane LANE provided to the plurality
of wire links according to the C-PHY defined by the MIPI
alliance.

The physical layer circuit 210 according to an example
embodiment includes a decoder 213. The decoder 213
calculates a symbol based on a preceding differential signal,
a reception differential signal, and a control code.

The decoder of the physical layer circuit of a conventional
reception interface circuit calculates a symbol based only on
a preceding differential signal and a reception differential
signal. To the contrary, the decoder 213 of the physical layer
circuit 210 of the reception interface circuit 200_2 according
to an example embodiment calculates a symbol further
based on the control code CONTROL_CODE. The control
code is a code that instructs decoding change based on the
coupling relationship of the plurality of three-phase wire
links.

That is, the reception interface circuit 200_2 supports
swapping or change of a wire link similar to the transmission
interface circuit 100 of FIG. 1. When the reception interface
circuit 200_2 supports swapping or change of a wire link,
the transmission interface circuit 100_2 may transmit a data
signal to the data lane LANE without considering the
swapping or change of the wire link.

The physical layer circuit 210 de-maps the calculated
symbol to a bit code of received data Rx_Data. The received
data Rx_Data output from the physical layer circuit 210 may
be data in the form of packet data.

The protocol layer circuit 110 may receive the packet data
Rx_Data, extract payload based on a header and footer, and
generate data.

Depending on the coupling settings between components,
the coupling relationship between the transmission pins
TXPIN_A, TXPIN_B, and TXPIN_C and the reception pins
RXPIN_A, RXPIN_B, and RXPIN_C may change. FIG. 12
illustrates that the transmission pins TXPIN_A, TXPIN_B,
and TXPIN_C are sequentially coupled to the reception pins
RXPIN_A, RXPIN_B, and RXPIN_C, respectively, but the
coupling relationship may be changed.

The reception interface circuit 200_2 according to an
example embodiment may change decoding of the reception
differential signal based on a change in the coupling rela-
tionship between the transmission pins TXPIN_A,
TXPIN_B, and TXPIN_C and the reception pins RXPIN_A,
RXPIN_B, and RXPIN_C.

Figure 13:
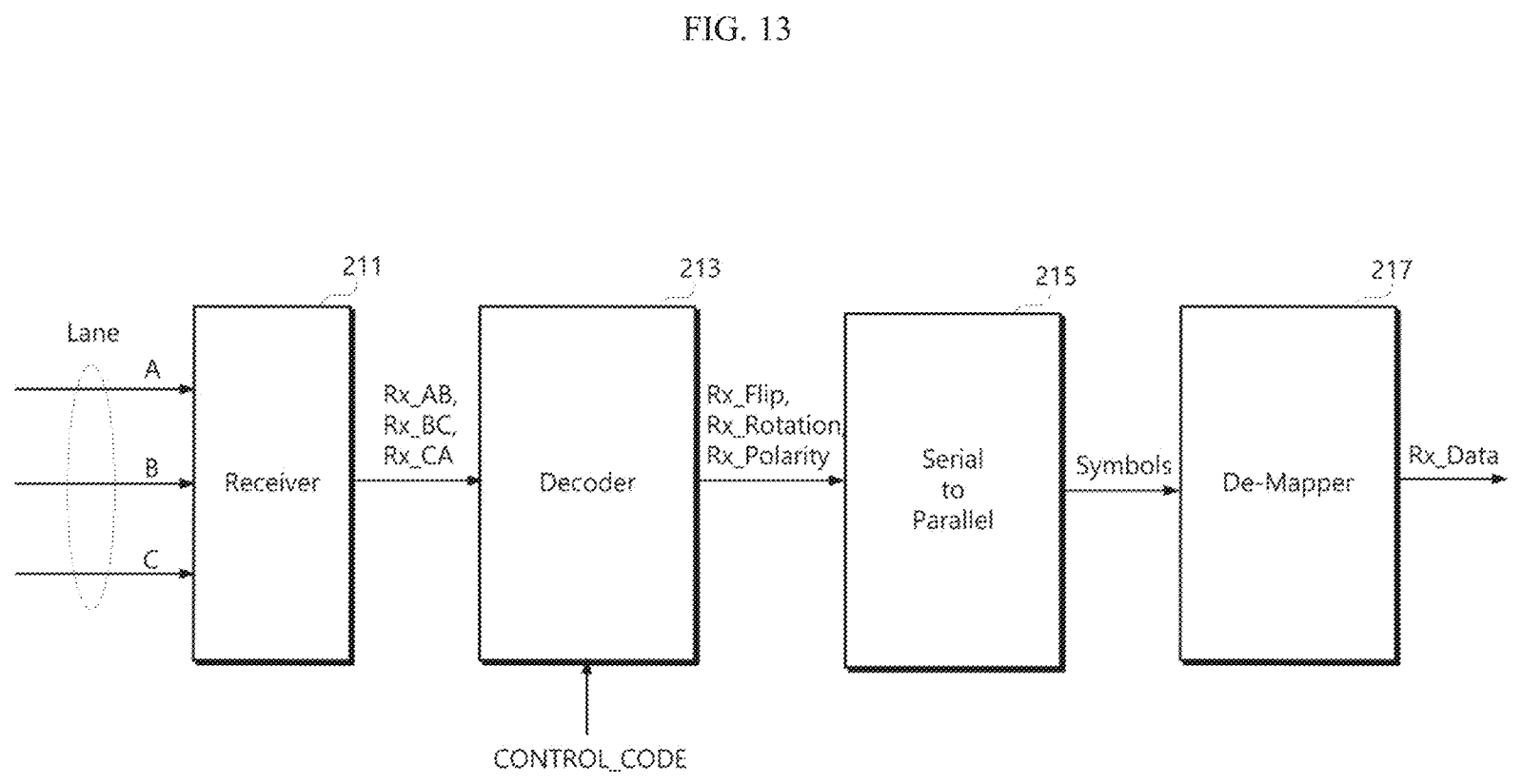

FIG. 13 is a block diagram illustrating in detail the
physical layer circuit according to an example embodiment.

Referring to FIG. 13, the physical layer circuit 210
includes a receiver 211, the decoder 213, a serial-to-parallel
converter 215, and a de-mapper 217.

FIG. 13 illustrates the transmission pins TXPIN_A,
TXPIN_B, and TXPIN_C sequentially coupled to wire link
A, wire link B and wire link C, but the coupling relationship
may be changed. For example, the physical layer circuit
according to the example embodiment in FIG. 13 may
support A/C line swapping in which transmission pin A
TXPIN_A is coupled to wire link C, and transmission pin C
TXPIN_C is coupled to wire link A. Other types of line
swapping of the plurality of wire links may also be sup-
ported.

The receiver 211 outputs differential signals Rx_AB,
Rx_BC, and Rx_CA based on the difference between the
driving signals of each wire link based on the reception state.

The decoder 213 according to an example embodiment
calculates a symbol composed of 3 binary bits based on the
differential signals Rx_AB, Rx_BC, and Rx_CA and the
control code CONTROL_CODE. The 3 binary bits may
include the flip bit Tx_Flip, the rotation bit Tx_Rotation, and
the polarity change bit Tx_Polarity. Each binary bit of the
symbol may instruct the type of transition from the preced-
ing differential signal to the receiving differential signal.

The preceding differential signal and the receiving differ-
ential signal may correspond to a wire state that defines the
signal levels of three 3-phase wire links according to the
C-PHY of the MIPI.

The control code CONTROL_CODE may instruct an
decoding change based on the coupling relationship of the
plurality of wire links. For example, the control code CON-
TROL_CODE may instruct decoding based on A/C line
swapping, B/C line swapping, and A/B line swapping. The
control code CONTROL_CODE may instruct decoding
based on changing A/B/C lines to B/C/A lines or changing
A/B/C lines to C/A/B lines, respectively.

The control code CONTROL_CODE may be stored in a
register outside the physical layer circuit. When the com-
ponent is initiated, the control code CONTROL_CODE may
be provided to the decoder 213. The control code CON-
TROL_CODE may be stored in the register as different
values according to different coupling relationships of the
plurality of wire links.

Each symbol output by the decoder 213 is provided to the
serial-to-parallel converter 215, and the serial-to-parallel
converter 215 exemplarily provides 7 symbols to the de-
mapper 217. The de-mapper 217 may de-map 7 symbols into
16 binary bit data and output the received data Rx_Data.

Figure 14:
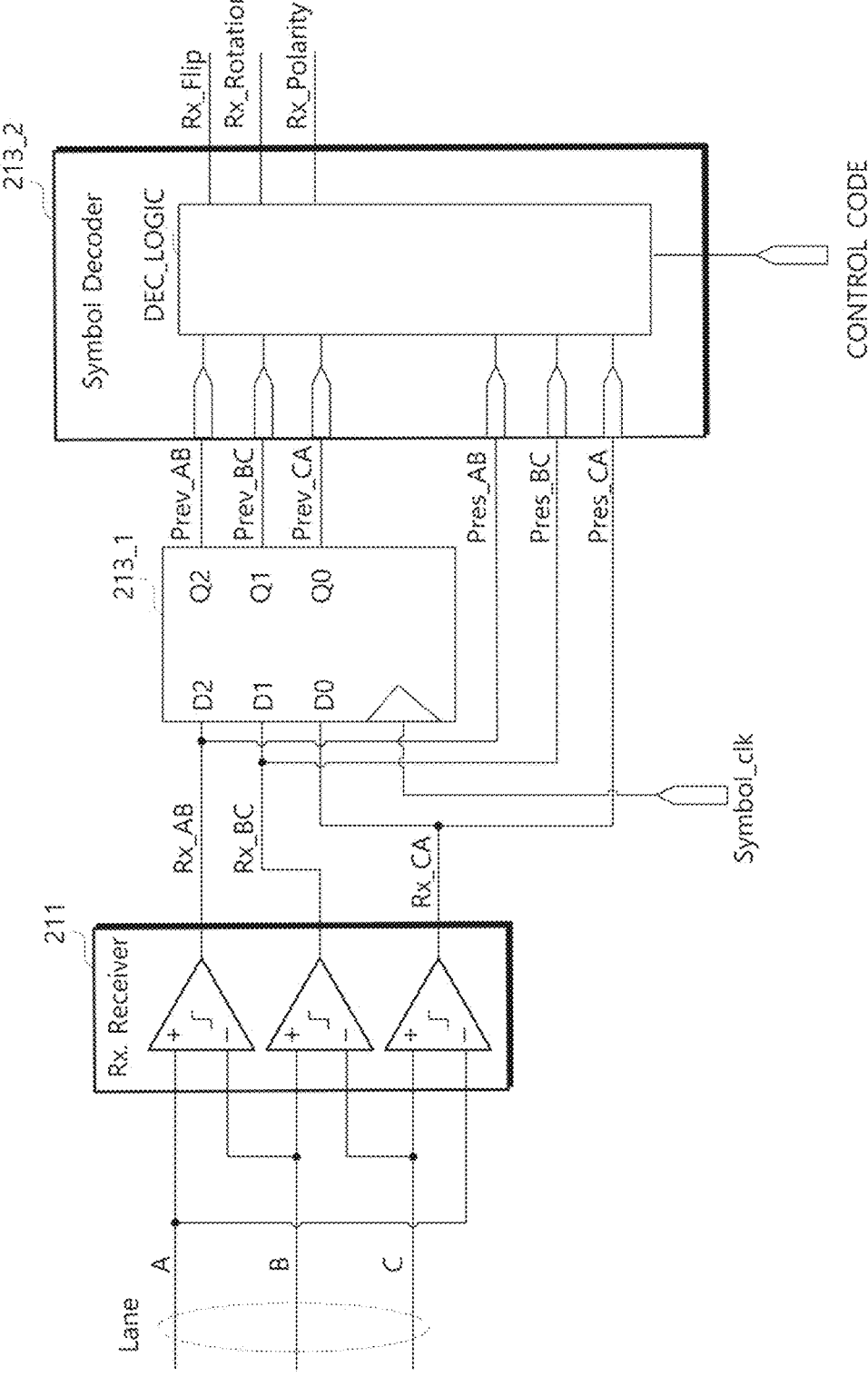
FIG. 14 is a circuit diagram illustrating a communication interface circuit according to an example embodiment.

FIG. 14 is a block diagram illustrating in detail the
decoder 213 according to the example embodiment of FIG.
13.

Referring to FIG. 14, the decoder 213 may include a
flip-flop circuit 213_1 and a symbol decoder 213_2.

FIG. 14 illustrates the transmission pins TXPIN_A,
TXPIN_B, and TXPIN_C sequentially coupled to the recep-
tion pins RXPIN_A, RXPIN_B, and RXPIN_C, but the
coupling relationship may be changed.

The receiver 211 outputs the differential signals Rx_AB,
Rx_BC, and Rx_CA based on the reception state.

The differential signals Rx_AB, Rx_BC, and Rx_CA may
be determined as shown in Table 9 based on the reception
state.

TABLE 9

| Rx Wire State | Rx_AB | Rx_BC | Rx_CA |
|---|---|---|---|
| +x | 1 | 0 | 0 |
| −x | 0 | 1 | 1 |
| +y | 0 | 1 | 0 |
| −y | 1 | 0 | 1 |
| +z | 0 | 0 | 1 |
| −z | 1 | 1 | 0 |

The differential signals Rx_AB, Rx_BC, and Rx_CA
output from the receiver 211 are provided to the flip-flop
circuit 213_1.

The flip-flop circuit 213_1 operates based on the clock
signal Symbol_Clk. The flip-flop circuit 213_1 may store the
differential signals Rx_AB, Rx_BC, and Rx_CA provided in
the first unit interval as preceding differential signals Prev_AB, Prev_BC, and Prev_CA. The flip-flop circuit 213_1 may provide the differential signals Rx_AB, Rx_BC, and Rx_CA received in the first unit interval to the decoder 213_2 in the second unit interval, which is the next unit interval consecutive to the first unit interval, as the preceding differential signals Prev_AB, Prev_BC, and Prev_CA.

The symbol decoder 213_2 according to an example embodiment receives the preceding differential signals Prev_AB, Prev_BC, and Prev_CA, the reception differential signals Pres_AB, Pres_BC and Pres_CA, and the control code CONTROL_CODE.

The symbol decoder 213_2 decodes the reception differential signals Pres_AB, Pres_BC and Pres_CA based on the preceding differential signals Prev_AB, Prev_BC, and Prev_CA and the control code CONTROL_CODE, and outputs a symbol composed of 3 binary bits.

The 3 binary bits of the symbol may include the flip bit Tx_Flip, the rotation bit Tx_Rotation, and the polarity change bit Tx_Polarity. Each binary bit of the symbol may instruct the transition form from the preceding differential signals Prev_AB, Prev_BC, and Prev_CA to the reception differential signals Pres_AB, Pres_BC and Pres_CA.

The symbol decoder 213_2 may decode the reception differential signals Pres_AB, Pres_BC and Pres_CA appropriately for the coupling relationships of the plurality of wire links based on the provided control code CONTROL_CODE. The decoder may decode the reception state differently according to the coupling relationship of the plurality of wire links and output a symbol composed of 3 binary bits.

For example, when the provided control code CONTROL_CODE instructs A/C line swapping, based on the state diagram of FIG. 6, the symbol decoder 213_2 may decode wire states-y, +y, −x, +x, −z and +z according to the C-PHY of the MIPI into symbols corresponding to +x, −x, +y, −y, +z and −z, respectively. When the reception interface circuit receives a reception state of −y, and the control code CONTROL_CODE instructs A/C line swapping, the flip-flop circuit 213_1 outputs '101' as the reception differential signals Pres_AB, Pres_BC and Pres_CA for the reception state of −y based on Table 9. When the preceding differential signals Prev_AB, Prev_BC, and Prev_CA are, for example, '100' corresponding to wire state +x, the symbol decoder 213_2 may output '001' corresponding to the transition from wire state +x to wire state −y in the state diagram of FIG. 6 as the symbol composed of 3 binary bits. Each state in the state diagram of FIG. 6 may be replaced with bits corresponding to the differential signals in Table 9 to be used in the symbol decoder 213_2.

That is, when there is no line swapping, the preceding state +x and the reception state −y received by A/C line ceding state −y and the reception state +x based on the state diagram of FIG. 5 and output symbol '001'. Therefore, when the control code CONTROL_CODE instructs A/C line swapping, it is identical to the symbol '001' output corresponding to the transition from the wire state +x to the wire state −y in the state diagram of FIG. 6.

Accordingly, when the control code CONTROL_CODE instructs decoding based on A/C line swapping, B/C line swapping, and A/B line swapping, the symbol decoder 213_2 may perform decoding based on the state diagram of FIG. 6. When the control code CONTROL_CODE instructs decoding based on the change from the A/B/C lines to the B/C/A lines or the C/A/B lines, the symbol decoder 213_2 may perform decoding based on the state diagram of FIG. 7.

Figure 15:
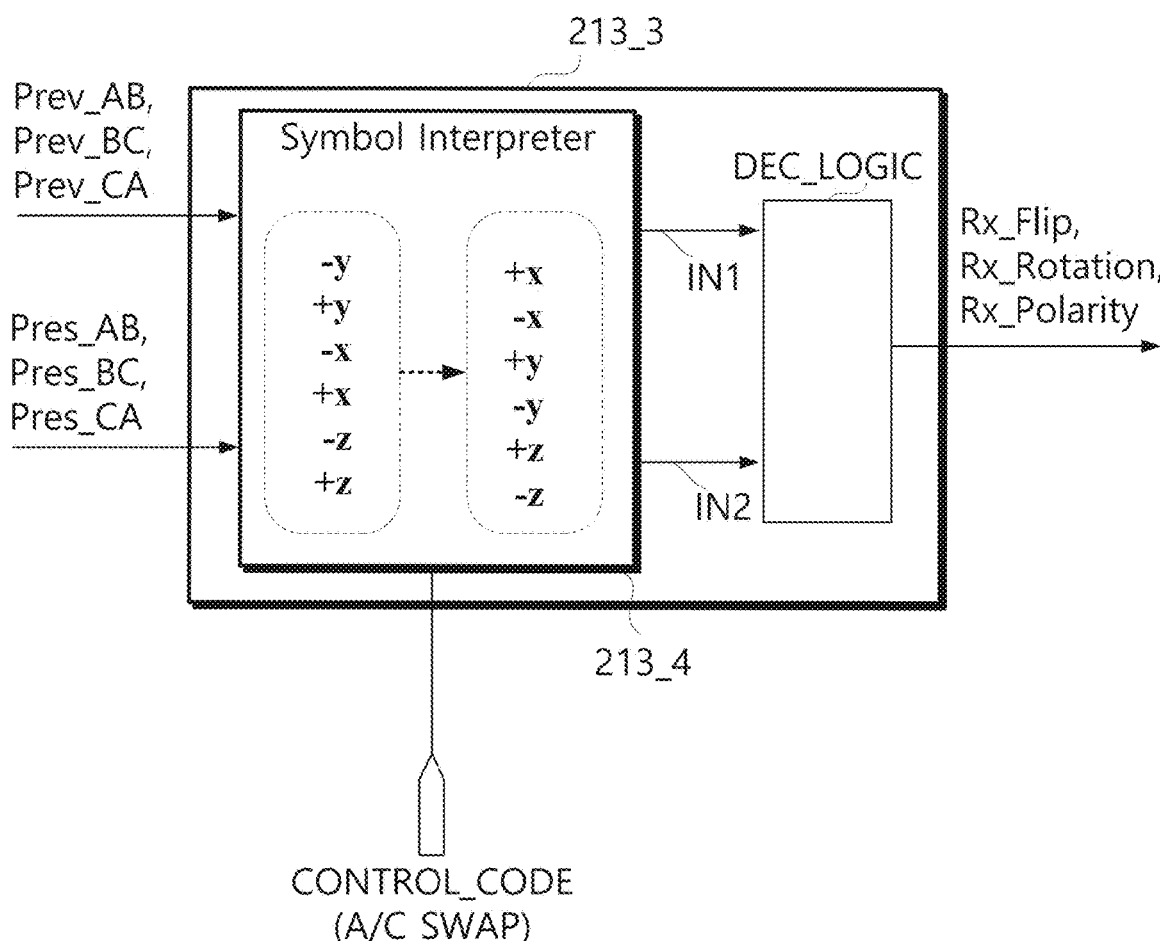
FIG. 15 is a block diagram illustrating a decoder according to an example embodiment.

FIG. 15 is a block diagram illustrating another example of the decoder 213 according to the example embodiment of FIG. 13.

Referring to FIG. 15, the decoder 213 may include a symbol decoder 213_3. The symbol decoder 213 receives the reception differential signals Pres_AB, Pres_BC, and Pres_CA and the preceding differential signals Prev_AB, Prev_BC, and Prev_CA from the receiver 211 and the flip-flop circuit 213_1 which are the same as in FIG. 14, respectively. In addition, a symbol interpreter 213_4 receives the control code CONTROL_CODE.

The symbol decoder 213_3 according to an example embodiment may include the symbol interpreter 213_4. The symbol interpreter 213_4 converts the reception differential signals Pres_AB, Pres_BC, and Pres_CA and the preceding differential signals Prev_AB, Prev_BC, and Prev_CA based on the control code CONTROL_CODE, and output them to a first output line IN1 and a second output line IN2.

For example, when the control code CONTROL_CODE instructs decoding based on A/C line swapping, the symbol interpreter 213_4 may convert the reception differential signals Pres_AB, Pres_BC, and Pres_CA and the preceding differential signals Prev_AB, Prev_BC, and Prev_CA as shown in FIG. 15. Referring to Table 10 illustrating the symbol conversion relationship based on A/C line swapping, when the reception differential signal Pres_AB, Pres_BC, and Pres_CA is '101' generated based on the reception state of −y, the symbol interpreter 213_4 may be converted to '100' corresponding to the reception state of +x and output to the first output line IN1. The decoding logic DEC_LOGIC may calculate symbols Rx_Flip, Rx_Rotation, and Rx_Polarity based on the current differential signals Pres_AB, Pres_BC, and Pres_CA and the preceding differential signals Prev_AB, Prev_BC, and Prev_CA with line swapping restored based on the state diagram of FIG. 5. Accordingly, the decoding logic DEC_LOGIC in FIG. 15 may be different from the decoding logic DEC_LOGIC in FIG. 14.

TABLE 10

Figure 16:
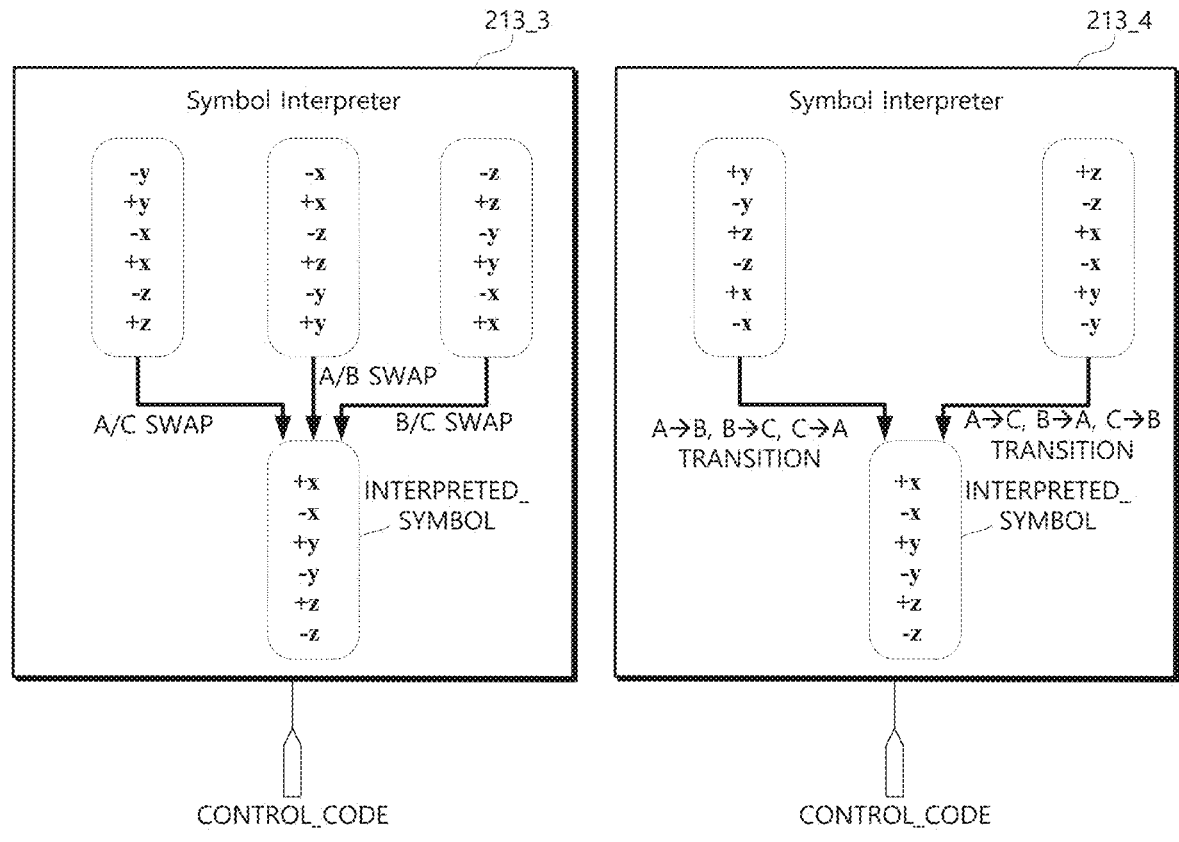
FIG. 16 is a diagram illustrating a symbol interpreter of a decoder according to an example embodiment.

| Rx Wire State | Pres_AB | Pres_BC | Pres_CA | Converted Wire State | Converted Pres_AB | Converted Pres_BC | Converted Pres_CA |
|---|---|---|---|---|---|---|---|
| −y | 1 | 0 | 1 | +x | 1 | 0 | 0 |
| +y | 0 | 1 | 0 | −x | 0 | 1 | 1 |
| −x | 0 | 1 | 1 | +y | 0 | 1 | 0 |
| +x | 1 | 0 | 0 | −y | 1 | 0 | 1 |
| −z | 1 | 1 | 0 | +z | 0 | 0 | 1 |
| +z | 0 | 0 | 1 | −z | 1 | 1 | 0 | swapping correspond to the preceding wire state −y and the reception state +x, respectively. When there is no line swapping, the symbol decoder 213_2 may decode the pre- When the control code CONTROL_CODE instructs decoding based on A/C line swapping (A/C SWAP), decoding based on A/B line swapping (A/B SWAP), and decoding based on B/C line swapping (B/C SWAP), the symbol interpreter 213_3 may convert the reception differential signals Pres_AB, Pres_BC, and Pres_CA and the preceding differential signals Prev_AB, Prev_BC, and Prev_CA, respectively, with reference to FIG. 16. When the control code CONTROL_CODE instructs decoding based on changes of line A, line B, and line C to line B, line C, and line A, respectively (A→B, B→C and C→A transitions), and decoding based on changes of line A, line B, and line C to line C, line A, and line B, respectively (A→C, B→A and C→B transitions), the symbol interpreter 213_4 may convert the reception differential signals Pres_AB, Pres_BC, and Pres_CA and the preceding differential signals Prev_AB, Prev_BC, and Prev_CA, respectively, with reference to FIG. 16.

The symbol interpreters 213_3 and 213_4 may be implemented through various schemes, such as a plurality of multiplexers or a table-type memory device.

Figure 17:
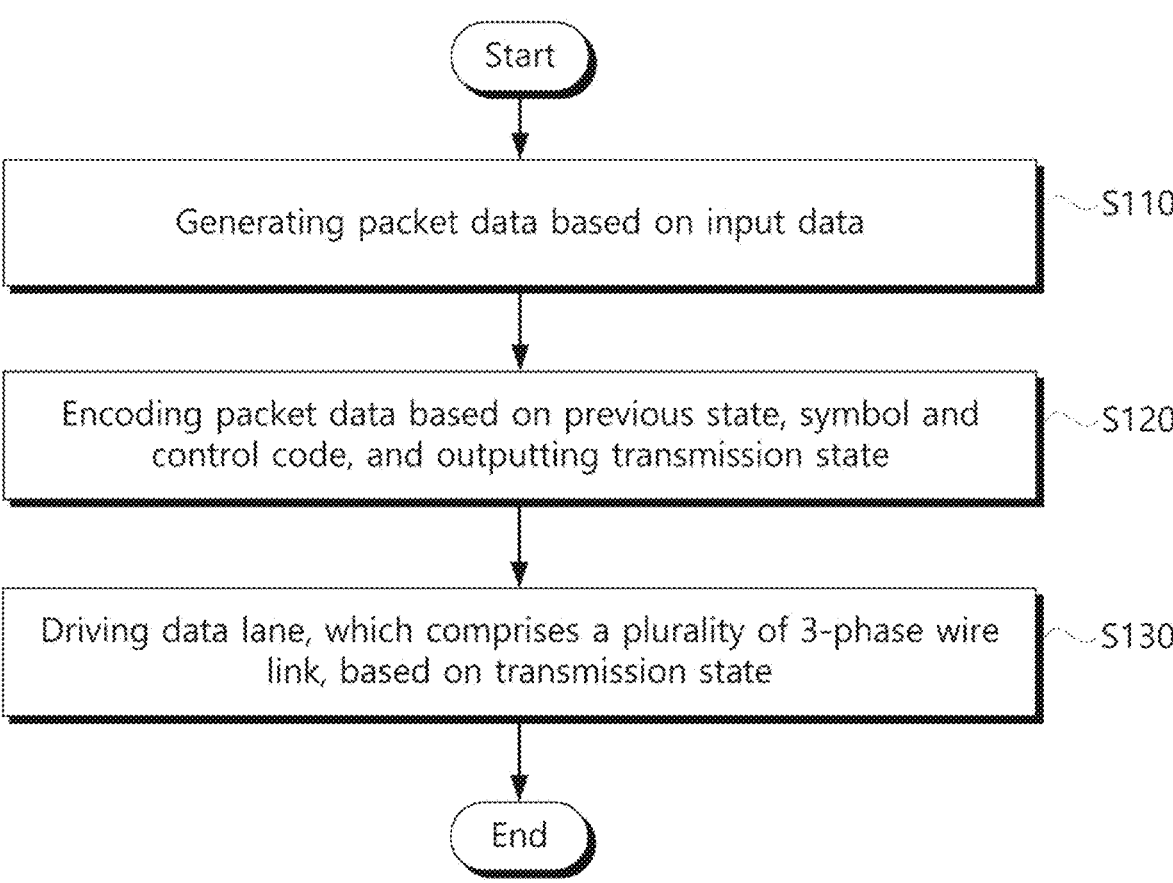
FIG. 17 is a flowchart illustrating a method of operating a transmission-side communication interface circuit according to an example embodiment.

FIG. 17 is a flowchart illustrating a method of operating a transmission-side communication interface circuit according to an example embodiment.

A communication interface circuit transmits data signals through data lanes provided on a plurality of three-phase wire links. According to an example embodiment, a data lane may be driven based on C-PHY of MIPI.

In operation S110, the communication interface circuit may process the input data in the form of packet data. The communication interface circuit may generate a payload based on input data, and insert a header and footer suitable for transmission before and after the payload, respectively to generate the transmission data in the form of packet data.

According to an example embodiment, the communication interface circuit may generate the transmission data according to CSI-2, DSI and DSI-2 defined by the MIPI alliance.

In operation S120, the communication interface circuit may encode transmission data, which is packet data, and output a transmission state.

The communication interface circuit may calculate the transmission state based on the symbol to which the transmission data is mapped, the preceding state, and the control code.

The communication interface circuit may map 16 binary bit data of transmission data to 7 symbols and then perform encoding.

Each symbol may include the flip bit Tx_Flip, the rotation bit Tx_Rotation, and the polarity change bit Tx_Polarity that instruct the transition type from the preceding state to the transmission state based on the previous symbol. Therefore, a symbol may be expressed with 3 binary bits.

The transmission state may be a wire state that defines the signal levels of three 3-phase wire links according to C-PHY of MIPI.

The control code may be a code that instructs an encoding change based on the coupling relationship of the plurality of three-phase wire links.

According to an example embodiment, based on the control code, the communication interface circuit may perform encoding differently depending on the swapping of two of three three-phase wire links (wire link A, wire link B, and wire link C) according to C-PHY of MIPI.

For example, based on the received control code, the same symbol may be encoded into mutually different wire states when swapping wire link A and wire link C, swapping wire link A and wire link B, and swapping wire link B and wire link C.

According to an example embodiment, based on the control code, the communication interface circuit may perform encoding differently according to the changes of all the three 3-phase wire links according to C-PHY of MIPI.

The communication interface circuit may perform encoding appropriately for the changed coupling relationship of communication links, based on the control code indicating a change in the coupling relationship of communication links. As a result, deterioration of the communication channel may be reduced and data signals may be transmitted stably. In addition, the communication interface circuit may stably transmit data signals by supporting various interconnections between components due to the arrangement of coupling terminals.

The communication interface circuit may perform encoding based on the state diagram of FIG. 5 when the control code instructs not to exchange or change A/B/C lines.

The communication interface circuit may perform encoding based on the state diagram of FIG. 6 when the control code instructs to exchange two of A/B/C lines.

The communication interface circuit may encode a symbol based on the control code that instructs encoding based on A/C line swapping. That is, the communication interface circuit may encode a symbol to output the transmission state to −y, +y, −x, +x, −z, and +z on the reception side corresponding to the reception of wire state +x, −x, +y, −y, +z, and −z on the reception side, respectively.

The communication interface circuit may encode a symbol based on the control code that instructs encoding based on A/B line swapping. That is, the communication interface circuit may encode a symbol to output the transmission state to −x, +x, −z, +z, −y, and +y on the reception side corresponding to the reception of wire state +x, −x, +y, −y, +z, and −z on the reception side, respectively.

The communication interface circuit may encode a symbol based on the control code that instructs encoding based on B/C line swapping. That is, the communication interface circuit may encode a symbol to output the transmission state to −z, +z, −y, +y, −x, and +x on the reception side corresponding to the reception of wire state +x, −x, +y, −y, +z, and −z on the reception side, respectively.

The communication interface circuit may encode a symbol based on a control code that instructs encoding based on changes of line A, line B, and line C to line B, line C, and line A in order, respectively. That is, the communication interface circuit may encode a symbol to output the transmission state to +y, −y, +z, −z, +x, and −x on the reception side corresponding to the reception of wire state +x, −x, +y, −y, +z, and −z on the reception side, respectively.

The communication interface circuit may encode a symbol based on a control code that instructs encoding based on changes of line A, line B, and line C to line C, line A, and line B in order, respectively. That is, the communication interface circuit may encode a symbol to output the transmission state to +z, −z, +x, −x, +y, and −y on the reception side corresponding to the reception of wire state +x, −x, +y, −y, +z, and −z on the reception side, respectively.

In operation S120, the communication interface circuit may drive the plurality of 3-phase wire links based on the transmission state and transmit a data signal to the data lane provided on the 3-phase wire link.

The communication interface circuit may generate the plurality of driving signals for driving three three-phase wire links based on C-PHY of MIPI based on the transmission state.

The communication interface circuit may drive the plurality of wire links based on each generated driving signal, regardless of a change in the coupling relationship of the plurality of wire links. That is, because the transmission state is calculated appropriately for the changed coupling relationship of the plurality of wire links based on the control code in operation S120, the driving signals generated based on the transmission state may directly drive each of the plurality of wire links based on the driving signals.

Meanwhile, specific example embodiments have been described above. The present disclosure may include not only the above-described example embodiments, but also simple design changes or easily changeable example embodiments. In addition, the present disclosure may include techniques that can easily modify and implement the example embodiments. Therefore, the scope should not be limited to the above-described example embodiments, but should be defined by the claims described below as well as the claims and equivalents.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Example embodiments have been described above with the aid of method steps illustrating the performance of specified functions and relationships thereof. The boundaries and sequence of these functional building blocks and method steps have been defined herein for convenience of description. Alternate boundaries and sequences can be defined, so long as the specified functions and relationships are appropriately performed. Any such alternate boundaries or sequences are thus within the scope and spirit of the claims.

In various example embodiments herein, reference may have been made to various circuit elements, including but not limited to capacitors, resistor, inductors, switches, amplifiers, comparators, filters, flip flops, drivers, and transistors. Various different types of digital, analog, active and/or passive components are available for use in implementing the example embodiments. For example, various different transistor types can be used depending on the implementation, whether positive or negative logic is used, manufacturing processes employed, or the like. Furthermore, unless specifically stated otherwise herein, there are many available types of filters, comparators, switches, and the like that can be used to implement the example embodiments.

What is claimed is:

1. A communication interface circuit comprising:
a protocol layer circuit configured to generate packet data based on input data; and
a physical layer circuit configured to encode the packet data to output a transmission state, and drive a data lane including a plurality of three-phase wire links based on the transmission state,
wherein the physical layer circuit includes an encoder configured to calculate the transmission state based on a preceding state output from the encoder in a previous unit interval, a symbol mapped to the packet data, and a control code, and wherein the control code is configured to instruct an encoding change based on a coupling relationship of the plurality of three-phase wire links.

2. The communication interface circuit of claim 1, wherein the physical layer circuit includes:
a mapping circuit configured to map the packet data to the symbol;
the encoder configured to calculate the transmission state based on the preceding state, the symbol, and the control code;
a pre-driver control circuit configured to control a plurality of driving drivers based on the transmission state; and
the plurality of driving drivers configured to drive the plurality of three-phase wire links based on control of the pre-driver control circuit, respectively.

3. The communication interface circuit of claim 2, wherein an output of the pre-driver control circuit is provided directly to the plurality of driving drivers.

4. The communication interface circuit of claim 1, wherein the encoder is configured to receive the control code from an external register.

5. The communication interface circuit of claim 1, wherein the physical layer circuit is based on a C-PHY of a mobile industry processor interface (MIPI).

6. The communication interface circuit of claim 5, wherein the plurality of three-phase wire links include a first wire link, a second wire link, and a third wire link,
the control code is configured to instruct the encoding change based on a swapping relationship between the first wire link and the third wire link, and
the encoder is configured to output the transmission state to each of −y, +y, −x, +x, −z, and +z corresponding to each reception of wire states of +x, −x, +y, −y, +z, and −z based on the C-PHY of the MIPI of a receiving end.

7. The communication interface circuit of claim 5, wherein the plurality of three-phase wire links include a first three-phase wire link, a second three-phase wire link, and a third three-phase wire link,
the control code is configured to instruct an encoding change based on a swapping relationship between two of the first, second and third three-phase wire links, and
the encoder is configured to increase letters from the preceding state corresponding to the symbol of bit code '000' and to output the transmission state that maintains a polarity of the preceding state.

8. The communication interface circuit of claim 5, wherein the plurality of three-phase wire links include a first three-phase wire link, a second three-phase wire link, and a third three-phase wire link,
the control code is configured to instruct an encoding change based on a swapping relationship between two of the first, second and third three-phase wire links, and
the encoder is configured to increase letters from the preceding state corresponding to the symbol of bit code '001' and outputs the transmission state that changes a polarity of the preceding state.

9. The communication interface circuit of claim 5, wherein the plurality of three-phase wire links include a first three-phase wire link, a second three-phase wire link, and a third three-phase wire link,
the control code is configured to instruct an encoding change based on a swapping relationship between two of the first, second and third three-phase wire links, and
the encoder is configured to decrease letters from the preceding state corresponding to the symbol of bit code '010' and outputs the transmission state that maintains a polarity of the preceding state.

10. The communication interface circuit of claim 5, wherein the plurality of three-phase wire links include a first three-phase wire link, a second three-phase wire link, and a third three-phase wire link, the control code is configured to instruct an encoding change based on a swapping relationship between two of the first, second and third three-phase wire links, and the encoder is configured to decrease letters from the preceding state corresponding to the symbol of bit code '011' and outputs the transmission state that changes a polarity of the preceding state.

11. The communication interface circuit of claim 5, wherein the plurality of three-phase wire links include a first three-phase wire link, a second three-phase wire link, and third three-phase wire link, the control code is configured to instruct encoding change based on a relationship of changing the first three-phase wire link to the second three-phase wire link, changing the second three-phase wire link to the third three-phase wire link, and changing the third three-phase wire link to the first three-phase wire link, the encoder is configured to output the transmission state to each of +y, −y, +z, −z, +x, and −x corresponding to each reception of wire states of +x, −x, +y, −y, +z, and −z based on the C-PHY of the MIPI of a receiving end.

12. The communication interface circuit of claim 5, wherein the plurality of three-phase wire links include a first three-phase wire link, a second three-phase wire link, and a third three-phase wire link, the control code is configured to instruct encoding change based on a relationship of changing the first three-phase wire link to the third three-phase wire link, changing the second three-phase wire link to the first three-phase wire link, and changing the third three-phase wire link to the second three-phase wire link, the encoder is configured to output the transmission state to each of +z, −z, +x, −x, +y, and −y corresponding to each reception of wire states of +x, −x, +y, −y, +z and −z based on the C-PHY of the MIPI of a receiving end.

13. The communication interface circuit of claim 5, wherein the plurality of three-phase wire links include a three-phase first wire link, a second three-phase wire link, and a three-phase third wire link, and the encoder is configured to output different transmission states based on different control codes corresponding to a plurality of identical wire states received by a receiving end based on the C-PHY of the MIPI.

14. A communication interface circuit comprising:

a physical layer circuit configured to generate a plurality of differential signals based on driving voltages of each of a plurality of three-phase wire links of a data lane and output a symbol based on the plurality of differential signals; and a protocol layer circuit configured to de-map the symbol and output data, wherein the physical layer circuit includes a decoder that is configured to calculate the symbol based on a reception differential signal based on the plurality of differential signals, a preceding differential signal based on the plurality of differential signals in a previous unit interval, and a control code, and wherein the control code is configured to instruct a decoding change based on a coupling relationship of the plurality of three-phase wire links.

15. The communication interface circuit of claim 14, wherein the physical layer circuit is based on a C-PHY of a mobile industry processor interface (MIPI).

16. The communication interface circuit of claim 14, wherein the plurality of three-phase wire links include a first three-phase wire link, a second three-phase wire link, and a third three-phase wire link, the control code is configured to instruct the decoding change based on a swapping relationship between the first three-phase wire link and the third three-phase wire link, and the decoder includes a symbol interpreter that is configured to convert a plurality of differential signals corresponding to wire states of −y, +y, −x, +x, −z, and +z received based on the C-PHY of the MIPI into a plurality of differential signals corresponding to +x, −x, +y, −y, +z, and −z, respectively.

17. A method of operating a communication interface circuit, the method comprising:

generating packet data based on input data;

encoding the packet data to output a transmission state; and driving a data lane based on the transmission state, the data lane including a plurality of three-phase wire links, wherein the encoding of the packet data includes calculating the transmission state based on a preceding state output in a previous unit interval, a symbol mapped to the packet data, and a control code, and the control code instructs an encoding change based on a coupling relationship of the plurality of three-phase wire links.

18. The method of claim 17, wherein the plurality of three-phase wire links include a first three-phase wire link, a second three-phase wire link, and a third three-phase wire link, and wherein the encoding of the packet data includes outputting different transmission states based on different control codes corresponding to a plurality of identical wire states received by a receiving end based on a C-PHY of a MIPI.

19. The method of claim 17, wherein the driving of the data lane includes:

generating a plurality of driving signals to drive a plurality of driving drivers based on the transmission state; and directly providing the plurality of driving signals to the plurality of driving drivers.

20. The method of claim 17, wherein the data lane is driven based on a C-PHY of a mobile industry processor interface (MIPI), the plurality of three-phase wire links include three three-phase wire links, and the symbol includes 3 binary bits, and wherein the method further includes outputting the transmission state with characters of the preceding state increased based on a middle bit of the symbol being '0', and outputting the transmission state with the characters of the preceding state decreased based on the middle bit of the symbol being '1', corresponding to the control code instructing the encoding change based on a swapping relationship of two of the three three-phase wire links.

* * * * *